(12) United States Patent
Bart

(10) Patent No.: US 10,965,899 B1
(45) Date of Patent: Mar. 30, 2021

(54) SYSTEM AND METHOD FOR INTEGRATION OF A TELEVISION INTO A CONNECTED-HOME MONITORING SYSTEM

(71) Applicant: Alarm.com Incorporated, Tysons, VA (US)

(72) Inventor: Gary Franklin Bart, Weston, FL (US)

(73) Assignee: Alarm.com Incorporated, Tysons, VA (US)

( * ) Notice: Subject to any disclaimer, the term of this patent is extended or adjusted under 35 U.S.C. 154(b) by 0 days.

(21) Appl. No.: 15/955,653

(22) Filed: Apr. 17, 2018

Related U.S. Application Data

(60) Provisional application No. 62/486,384, filed on Apr. 17, 2017.

(51) Int. Cl.
  *G08B 23/00* (2006.01)
  *H04N 5/45* (2011.01)
  *H04N 7/18* (2006.01)
  *H04L 12/28* (2006.01)
  *H04N 21/478* (2011.01)

(52) U.S. Cl.
  CPC ........... *H04N 5/45* (2013.01); *H04L 12/2827* (2013.01); *H04N 7/181* (2013.01); *H04N 7/188* (2013.01); *H04N 21/478* (2013.01)

(58) Field of Classification Search
  CPC .......... H04N 5/45; H04N 7/181; H04N 7/188; H04N 2005/44521; H04L 12/2827
  See application file for complete search history.

(56) References Cited

U.S. PATENT DOCUMENTS

| | | | |
|---|---|---|---|
| 5,887,109 A | 3/1999 | Tsuji et al. | |
| 6,759,967 B1 * | 7/2004 | Staller | G08C 23/04 340/12.28 |
| 7,114,169 B1 * | 9/2006 | Kahn | G08B 25/085 725/32 |

(Continued)

OTHER PUBLICATIONS

Goughnouretal., Device Independent Information Sharing During Incident Response (Year: 2008).*

(Continued)

*Primary Examiner* — Quang Pham
(74) *Attorney, Agent, or Firm* — Fish & Richardson P.C.

(57) ABSTRACT

Method system and apparatus, including computer programs encoded on a storage device, for integrating a display device with a connected-home monitoring system. The method including receiving, by the source programming interrupt unit and from a monitoring unit of a property monitoring system, a source programming interrupt message that was (i) generated by the monitoring unit and (ii) includes instructions for the source programming interrupt unit to modify source programming received by a source programming unit, obtaining, by the source programming interrupt unit, image data that depicts a portion of the property that is associated an event detected by the monitoring unit, modifying, by the source programming interrupt unit, source programming received by the source programming unit to include the image data, and providing, by the source programming interrupt unit, the modified source programming to the display device for output on the display of the display device.

15 Claims, 9 Drawing Sheets

(56) References Cited

U.S. PATENT DOCUMENTS

| | | | |
|---|---|---|---|
| 7,636,578 B1* | 12/2009 | Cope | H04W 4/14 455/414.4 |
| 7,786,891 B2 | 8/2010 | Owens et al. | |
| 7,986,335 B2 | 7/2011 | Kenoyer et al. | |
| 8,098,281 B1 | 1/2012 | Croak et al. | |
| 8,677,418 B2* | 3/2014 | Wong | H04N 21/237 725/51 |
| 8,848,057 B2 | 9/2014 | Xu et al. | |
| 8,898,697 B2* | 11/2014 | Velazquez | H04N 21/4882 725/33 |
| 9,189,934 B2* | 11/2015 | Jentoft | G08B 13/19641 |
| 9,628,286 B1* | 4/2017 | Nguyen | H04L 12/2834 |
| 10,057,172 B2* | 8/2018 | Cui | H04L 47/122 |
| 2003/0189486 A1 | 10/2003 | Hilton-Bey | |
| 2003/0226143 A1* | 12/2003 | Michael | H04N 21/6131 725/32 |
| 2004/0155961 A1* | 8/2004 | Litwin, Jr. | H04N 7/108 348/155 |
| 2005/0091694 A1* | 4/2005 | Rambo | H04L 51/04 725/110 |
| 2005/0273831 A1* | 12/2005 | Slomovich | H04N 7/181 725/105 |
| 2006/0176324 A1* | 8/2006 | Ono | G06Q 10/00 345/698 |
| 2007/0165106 A1 | 7/2007 | Groves et al. | |
| 2008/0204222 A1* | 8/2008 | Teta | G08B 7/06 340/521 |
| 2009/0303672 A1 | 12/2009 | Shen et al. | |
| 2010/0070089 A1* | 3/2010 | Harrod | G05B 19/042 700/277 |
| 2010/0138853 A1* | 6/2010 | Tanaka | G11B 27/105 725/23 |
| 2011/0102588 A1* | 5/2011 | Trundle | H04N 7/188 348/143 |
| 2012/0119679 A1* | 5/2012 | Riesebosch | H05B 47/19 315/313 |
| 2012/0176218 A1* | 7/2012 | Ahn | G08B 25/005 340/5.54 |
| 2013/0125177 A1 | 5/2013 | Pino et al. | |
| 2013/0215266 A1* | 8/2013 | Trundle | G08B 13/19602 348/143 |
| 2014/0009609 A1* | 1/2014 | Webster | H04N 7/183 348/143 |
| 2014/0052785 A1* | 2/2014 | Sirpal | H04N 21/4316 709/204 |
| 2014/0095924 A1* | 4/2014 | Holden | H04L 12/1868 714/4.11 |
| 2014/0099067 A1 | 4/2014 | MacInnis | |
| 2014/0139681 A1* | 5/2014 | Jones, Jr. | G08B 27/001 348/159 |
| 2014/0290975 A1 | 10/2014 | Isaacks et al. | |
| 2014/0372759 A1* | 12/2014 | Ramachandran | H04N 21/647 713/171 |
| 2015/0124087 A1* | 5/2015 | Jones, Jr. | G08B 19/005 348/143 |
| 2015/0160635 A1* | 6/2015 | Schofield | G05B 11/01 700/90 |
| 2015/0187354 A1* | 7/2015 | Kim | G10L 15/22 704/246 |
| 2015/0189362 A1* | 7/2015 | Lee | G10L 15/22 725/38 |
| 2015/0206529 A1* | 7/2015 | Kwon | G10L 17/22 704/246 |
| 2015/0268829 A1* | 9/2015 | Martynov | G06F 3/04845 715/766 |
| 2015/0339911 A1* | 11/2015 | Coyne | G08B 23/00 340/517 |
| 2016/0005280 A1* | 1/2016 | Laska | G08B 13/1961 386/230 |
| 2016/0066011 A1* | 3/2016 | Ro | H04N 21/42222 725/38 |
| 2016/0134918 A1 | 5/2016 | Chen et al. | |
| 2016/0148493 A1* | 5/2016 | Arakawa | G08B 13/19652 348/143 |
| 2016/0205203 A1* | 7/2016 | Choi | H04L 67/16 709/222 |
| 2017/0005825 A1* | 1/2017 | Kim | H04L 67/26 |
| 2017/0039841 A1* | 2/2017 | Wilson | G08B 13/19656 |
| 2017/0063758 A1* | 3/2017 | Gao | H04M 1/72409 |
| 2017/0109984 A1* | 4/2017 | Child | H04N 5/144 |
| 2017/0116836 A1* | 4/2017 | Park | G08B 13/19 |
| 2017/0262392 A1* | 9/2017 | Tamura | G06F 13/22 |
| 2017/0318322 A1* | 11/2017 | Lamb | G08B 25/008 |
| 2018/0027126 A1* | 1/2018 | Stricker | G08B 25/00 370/328 |
| 2018/0113577 A1* | 4/2018 | Burns | H04N 21/47217 |
| 2018/0115788 A1* | 4/2018 | Burns | G06K 9/00771 |
| 2018/0146251 A1* | 5/2018 | Gardes | H04N 21/4126 |
| 2018/0167908 A1* | 6/2018 | Kotreka | H04W 4/029 |
| 2018/0199104 A1* | 7/2018 | Park | H04N 21/42201 |
| 2018/0282117 A1* | 10/2018 | Baldi | B66B 3/002 |
| 2020/0244475 A1* | 7/2020 | Hayashi | H04L 12/2818 |

OTHER PUBLICATIONS

Kalaiselvi et al., A Survey on Theft Surveillance and Detection Technologies (Year: 2019).*

Sabri et al, Virtual Reality-Based Interface for the Control of Multiple Surveillance Cameras (Year: 2007).*

Shao et al., Smart Monitoring Cameras Driven Intelligent Processing to Big Surveillance Video Data (Year: 2018).*

* cited by examiner

SYSTEM AND METHOD FOR INTEGRATION OF A TELEVISION INTO A CONNECTED-HOME MONITORING SYSTEM

CROSS-REFERENCE TO RELATED APPLICATIONS

This application claims the benefit of the U.S. Provisional Patent Application No. 62/486,384 filed Apr. 17, 2017 and entitled "System and Method for Integration of a Television into a Connected-Home Monitoring System," which is incorporated herein by reference in its entirety.

BACKGROUND

A variety of different types of events can occur at a property. Some events may result in theft of, or damage to, personal property and real property. Such events may include a fire, a flood, a home invasion, or the like. Other types of events may occur that do not involve theft or damage of personal property or real property. Such events may include, for example, the ringing of a doorbell, a garage door left open, or receipt of a message on a user device.

SUMMARY

A system and method for integrating a television with a connected-home monitoring system. The television is integrated into the connected-home monitoring system using a source programming interrupt unit. The source programming interrupt unit is installed between an audio-visual input port of the television and a source. The source programming interrupt unit can modify source programming based on instructions from the connected-home monitoring system. Modification of source programming may include, for example, overlaying a video feed from a camera of the connected-home monitoring system on top of source programming, overlaying a graphical interface that can be used to manipulate settings of a connected-home device on top of source programming, or the like. The modified source programming can be provided for output on a display of a display device such as a television.

Source programming to other display devices may also be modified using the techniques described herein. Other display devices whose source programming may be modified may include, for example, desktop computer displays, laptop computer displays, tablet displays, smartphone displays, or the like. For these displays, if not practicable to include an external source programming interrupt unit that is coupled between the display and a source programming unit, the source programming interrupt unit may be installed as either software or hardware associated with the display device. In other implementations, the source programming interrupt unit may be an independent hardware unit that includes software instructions that, when executed by the source programming interrupt unit performs the operations described herein.

According to one innovative aspect of the present disclosure, a method for integrating a display device with a connected-home monitoring system is disclosed. The method may include actions of receiving, by the source programming interrupt unit and from a monitoring unit of a property monitoring system, a source programming interrupt message that was (i) generated by the monitoring unit based on the detection of an event at a property monitored by the monitoring unit and (ii) includes instructions for the source programming interrupt unit to modify source programming received by a source programming unit that is coupled to a display device and the source programming interrupt unit, obtaining, by the source programming interrupt unit, image data that depicts a portion of the property that is associated with the detected event, modifying, by the source programming interrupt unit, source programming received by the source programming unit, wherein modifying the received source programming comprises changing the received source programming from an initial source programming that, when output on the display device, does not include the image data into a modified source programming that, when output on the display device, includes image data in place of at least a portion of the initial source programming, and providing, by the source programming interrupt unit, the modified source programming to the display device for output on the display of the display device.

Other aspects includes corresponding systems, apparatus, and computer programs to perform actions of methods defined by instructions encoded on computer storage devices.

These and other versions may optionally include one or more of the following features. For example, in some implementations, modifying the source programming may further include modifying the source programming so that, when the modified source programming is output on the display device, the image data is overlaid on top of at least a portion of the initial source programming.

In some implementations, obtaining, by the source programming interrupt unit, image data that depicts a portion of the property that is associated with the detected event may include identifying, based on the received source programming interrupt message, a particular camera that is capturing image data of a portion of the property that is associated with the detected event, transmitting, by the source programming interrupt unit, a request to the identified camera via one or more networks, and responsive to the transmitted request, receiving, by the source programming interrupt unit, image data from the particular camera.

In some implementations, the monitoring unit may (i) detect the event based on sensor data generated by one or more sensors installed at the property and (ii) determine a particular camera that is located within a vicinity of the sensor that generated the sensor data and the source programming interrupt message may include data that identifies the particular camera. In such implementations, obtaining, by the source programming interrupt unit, image data that depicts a portion of the property that is associated with the detected event may include identifying a particular camera that is capturing image data of a portion of the property that is associated with the detected event based on the data that identifies the particular camera that is included in the source programming interrupt message, transmitting, by the source programming interrupt unit, a request to the identified camera via one or more networks, and responsive to the transmitted request, receiving, by the source programming interrupt unit, image data from the particular camera.

In some implementations, the source programming unit may only be coupled to the display device through the source programming interrupt unit.

In some implementations, the monitoring unit may be located at a location that is remote from the property.

In some implementations, the detected event is the ringing of a doorbell installed at the property. In such implementations, obtaining, by the source programming interrupt unit, image data that depicts a portion of the property that is associated with the detected event may include obtaining image data from a doorbell camera. Such implementations may further include modifying the source programming to change the received source programming from an initial source programming that, when output on the display device, does not include the image data obtained from the doorbell camera to a modified source programming that, when output on the display device, includes the image data obtained from the doorbell camera in place of at least a portion of the initial source programming, and providing, by the source programming interrupt unit, the modified source programming that has been modified to include the image data obtained from the doorbell camera to the display device for output on the display of the display device.

In some implementations, the detected event may include the detection of an opening of a door or window at the property. In such implementations, obtaining, by the source programming interrupt unit, image data that depicts a portion of the property that is associated with the detected event may include obtaining image data from a camera that is configured to obtain image data of the portion of the property where the door or window is located. Such implementations may further include modifying the source programming to change the received source programming from an initial source programming that, when output on the display device, does not include the image data from the camera that is configured to obtain image data of the portion of the property where the door or window is located to a modified source programming that, when output on the display device, includes the image data obtained from the camera that is configured to obtain image data of the portion of the property where the door or window is located in place of at least a portion of the initial source programming, and providing, by the source programming interrupt unit, the modified source programming that has been modified to include the image data from the camera that is configured to obtain image data of the portion of the property where the door or window is located to the display device for output on the display of the display device.

In some implementations, the detected event may include the detection of motion in at least a portion of the property. In such implementations, obtaining, by the source programming interrupt unit, image data that depicts a portion of the property that is associated with the detected event may include obtaining image data from a camera that is configured to obtain image data of the portion of the property where motion was detected. Such implementations may further include modifying the source programming to change the received source programming from an initial source programming that, when output on the display device, does not include the image data of the portion of the property wherein motion was detected to a modified source programming that, when output on the display device, includes the image data of the portion of the property where motion was detected in place of at least a portion of the initial source programming, and providing, by the source programming interrupt unit, the modified source programming that has been modified to include the image data of the portion of the property where motion was detected to the display device for output in the display of the display device.

These and other implementations are described in more detail in the detailed description and accompanying drawings.

DETAILED DESCRIPTION

The present disclosure is directed towards a system and method that integrates a television into a connected-home monitoring system. A television may be integrated into a connected-home monitoring system using a source programming interrupt unit. The connected-home monitoring system may transmit instructions to the source programming interrupt unit to modify source programming. The source programming interrupt unit can modify source programming to facilitate display of high-resolution graphics on a display of the integrated television. The high-resolution graphics may be displayed on top of source programming, in place of source programming, in addition to source programming, or the like. The high-resolution graphics may include, for example, video feeds from one or more cameras, one or more light switch controls, one or more thermostat controls, or the like that are displayed using resolutions of 720p, 1080p, 4K, 8K, or even greater resolutions.

The source programming interrupt unit may also facilitate interaction with one or more connected-home monitoring system components in response to user requests. For example, the source programming unit may be configured to modify source programming based on user requests to access a video feed from a particular camera, turn a light off, turn a light on, adjust a thermostat, unlock a door, or the like. The user requests may include voice commands, input from a remote control, input from a smartphone, input from a tablet, input from a laptop, or the like. The requests may be received by an input unit of the source programming interrupt unit, by an input unit associated with a connected-home, by an input unit associated with a connected-home cloud server, or the like. The input unit may include, for example, one or more of a microphone, network interface (e.g., WiFi interface), or a combination thereof.

Figure 1:
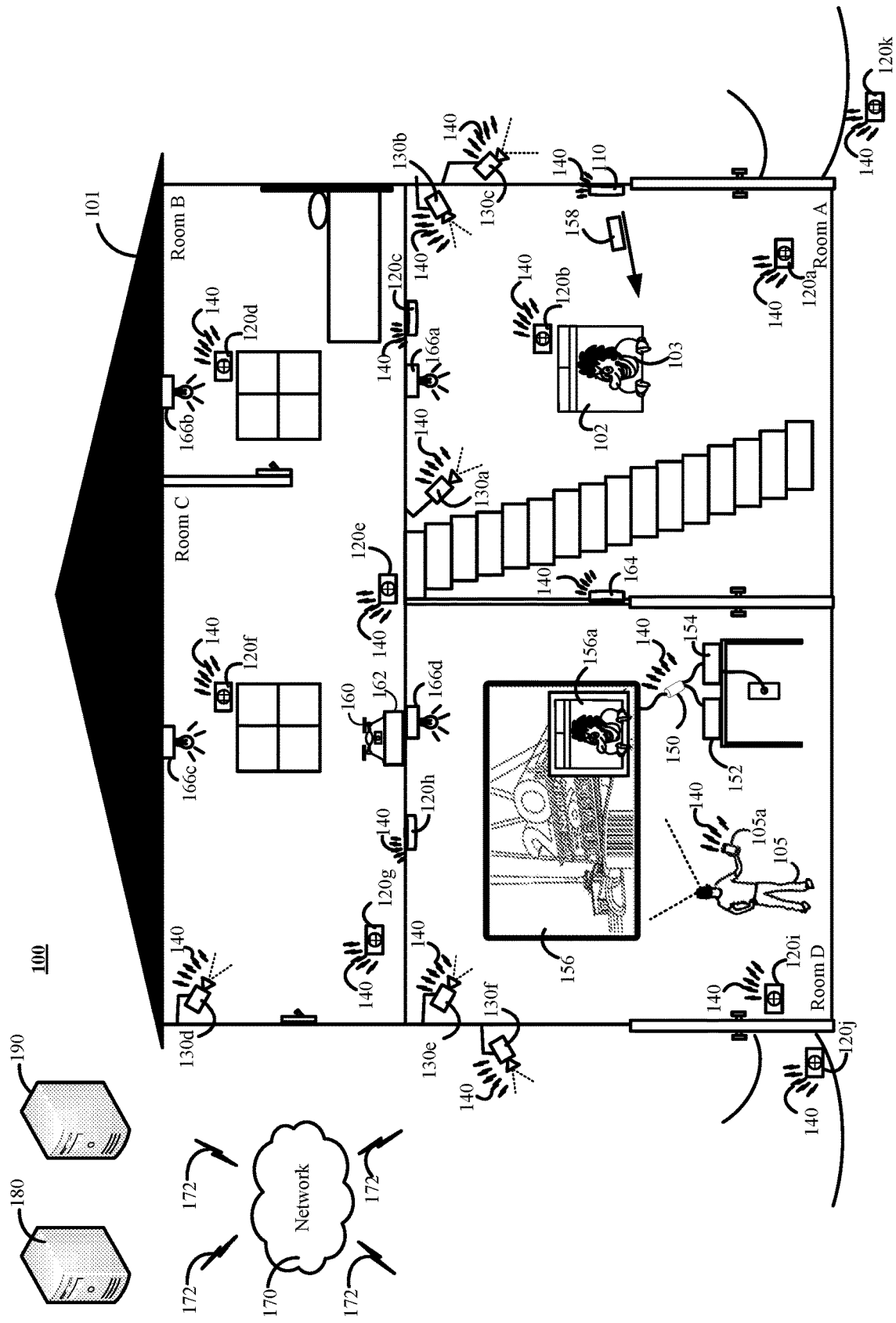
FIG. 1 is a contextual diagram of an example of a television that has been integrated into a connected-home monitoring system.

FIG. 1 is a contextual diagram of an example a television 156 that has been integrated into a connected-home monitoring system 100. The connected-home monitoring system 100 includes at least a monitoring system control unit 110, one or more sensors 120a, 120b, 120c, 120d, 120e, 120f, 120g, 120h, 120i, 120j, 120k, one or more cameras 130a, 130b, 130c, 130d, 130e, 130f, a network 140, a source programming interrupt unit 150, one or more source programming units 152, 154, and a television 156. Other optional components of the connected-home monitoring system 100 also depicted by FIG. 1 include a user device 105a, a drone 160, a drone charging station 162, a connected thermostat 164, one or more connected lightbulbs 166a, 166b, 166c, 166d, a network 170, a monitoring application server 180, a central alarm station server 190, or a combination thereof.

The source programming interrupt unit 150 integrates the television 156 into the connected-home monitoring system 100. In some implementations, the source programming interrupt unit 150 is configured to be installed between an audio-visual input port of the television 156 and the output of a source programming unit 152, 154. The source programming units 152, 154 may include, for example, a DVD player, a Blu-Ray player, a cable box, a satellite TV receiver, a content streaming device, or the like. In some implementations, the source programming interrupt unit 150 may include (i) a first connection point that includes an HDMI plug that is configured to be coupled to an HDMI port of the television 156 and (ii) a second connection point that includes an HDMI plug that is configured to be coupled to an HDMI a source programming unit 152, 154. However, the source programming interrupt unit 150 of the present disclosure need not be limited to HDMI connections. Instead, the source programming interrupt unit 150 may also be configured having a first connection point and a second connection point that connect to other types of audio-video ports such as USB-C ports. In yet other implementations, the functionality of the source programming interrupt unit 150 may be integrated within the display device (e.g., television 156) or the source programming unit 152, 154 to eliminate the need for an external intermediary unit between the display device (e.g., television 156) and the source programming unit 152, 154.

In some implementations, the source programming interrupt unit 150 may be configured such that there is a one-to-many connection between an audio-visual port on the television 156 and each of multiple source programming units 152, 154. In such instances, the source programming interrupt unit 150 may provide high-resolution graphics associated with one or more components of the connected-home monitoring system 100 on the display of the television 156 regardless of the input channel the user 105 has selected on the television 156. Alternatively, the source programming interrupt unit 150 may be configured such that there is a one-to-one connection between an audio-visual port on the television 156 and a single source programming unit 152, 154. In such instances, the source programming interrupt unit 150 may only provide high-resolution graphics associated with one or more components of the connected-home monitoring system 100 on the display of the television 156 if the user has currently selected television an input channel of the television 156 that has a source programming interrupt unit 150 residing between the audio-video port of the selected input channel and the source programming unit 152 providing source programming to the audio-video port of the selected television input channel.

The source programming interrupt unit 150 may include an audio-video input unit (e.g., HDMI input, USB-C input, or the like), an audio-video output unit (e.g., an HDMI output, USB-C output, or the like), a graphical processing unit, a network interface (e.g., WiFi, Bluetooth, cellular, or the like), and a power source (e.g., a battery). The audio-video input unit and the audio-video output unit can be used to install the source programming interrupt unit 150 between the television 156 and one or more source programming units 152, 154, as described above. The graphical processing unit is used to modify source programming provided by the source programming unit in response to an instruction from the monitoring application server 180, the monitoring system control unit 110, the user device 105a, a user voice command, or the like to interrupt and modify source programming to display high-resolution graphics associated with one or more components of the controlled-home monitoring system 100. In the absence of a received instruction to interrupt and modify source programming, the source programming unit allows source programming to pass from a source programming unit 152, 154 through the source programming interrupt unit 150 to the audio-visual input port of the television 156. The network interface allows the source programming interrupt unit 150 to connect to one or more networks such as network 140. The source programming interrupt unit 150 can receive instructions via the network 140, transmit requests for data from one or more components of the connected-home monitoring system 100, or the like. The network 140 may include one or more of a LAN, a WAN, a cellular network, the Internet, a Bluetooth network, a Z-wave network, or the like.

The monitoring system control unit 110 obtains sensor data that is generated by one or more sensors 120a, 120b, 120c, 120d, 120e, 120f, 120g, 120h, 120i, 120j, 120k. The monitoring system control unit 110 may analyze the obtained sensor data in order to infer whether one or more potential events are occurring in the property 101, within a predetermined proximity of the property 101, or both. Alternatively, in other implementations, the monitoring system control unit 110 (or other component of connected-home monitoring system 100) may relay the obtained sensor data to the monitoring application server 180 using the networks 140, 170, and one or more communication links 172. In such implementations, the monitoring application server may analyze the obtained sensor data in order to infer whether one or more potential events are occurring in the property 101. The monitoring application server 180 may then transmit a communication to the monitoring system control unit 110 indicating whether an event is detected in the property 101. Accordingly, the monitoring application server 180 can function as a cloud-based monitoring system control unit that is located at a location that is remote from the property where the monitoring system control unit 110, the sensors 120a, 120b, 120c, 120d, 120e, 120f, 120g, 120h, 120i, 120j, 120k, and the cameras 130a, 130b, 130c, 130d, 130e, 130f are located.

Events may include, for example, alarm events, emergency events, or the like. Alarm events may be inferred based on one or more sensors such as sensors 120a, 120b, 120c, 120d, 120e, 120f, 120g, 120h, 120i, 120j, 120k generating data that is indicative of a potential intruder 103 breaking-and-entering into property 101, a trespasser trespassing within a predetermined proximity of property 101, or the like. Emergency events may be inferred based on one or more sensors such as sensors 120a, 120b, 120c, 120d, 120e, 120f, 120g, 120h, 120i, 120j, 120k generating data that is indicative of a potentially hazardous event such as the presence of smoke, fire, carbon monoxide (or other gas), or the like. The detection of yet other types of events may also fall within the scope of the present disclosure.

Though events may be detected based on data generated by one or more sensors 120a, 120b, 120c, 120d, 120e, 120f, 120g, 120h, 120i, 120j, 120k the present disclosure need not be so limited. For example, an event may also be detected based on image data that is captured by one or more cameras 130a, 130b, 130c, 130d, 130e, 130f. Image data that is captured by the one or more cameras may include, for example, images, video, or both. The image data captured by one or more cameras 130a, 130b, 130c, 130d, 130e, 130f may be streamed to the monitoring system control unit 110, the monitoring application server 180, or both. The images, video, or both may be analyzed to determine whether the images, video, or both include data that is indicative of an alarm event such as, for example, a picture of an intruder on the property. In some implementations, a camera may be mounted to a robotic drone 160 that can navigate the property 101 and collect images, videos, or the like of objects on the property 101 grounds. Such images, video, or both can be analyzed in an effort to detect potential events.

With reference to the example of FIG. 1, a sensor 120b has detected movement, glass break, or the like that is indicative of an intruder 103 breaking into a window 102 in an attempt to gain entry to the property 101. The sensor 120b generates sensor data that is detected by, for example, the monitoring system control unit 110. The monitoring system control unit 110 may analyze the detected sensor data and determine that an alarm event (e.g., a home invasion) is in progress in Room A. Alternatively, or in addition, the monitoring system control unit 110 (or other component of the connected-home monitoring system 100) can relay the detected sensor data to the monitoring application server 180 via the networks 140 and 170. The network 170 may include a LAN, WAN, a cellular network, the Internet, or a combination thereof. In such instances, the monitoring application server 180 can analyze the received sensor data and determine that an alarm event (e.g., a home invasion) is in progress. The monitoring application server 180 can transmit data to the monitoring system control unit 110 indicating the existence of the alarm event in Room A.

The monitoring system control unit 110 (or the monitoring application server 180) may generate and transmit a message 158 to the source programming interrupt unit 150 via the network 140 (or the networks 140, 170). The message 158 may include instructions that instruct the source programming interrupt unit 150 to interrupt and modify source programming provide by the one of the source programming units 152, 154. In some implementations, the message 158 may also include, for example, data identifying a camera that is capturing a video feed in the vicinity of the sensor 120b that generated sensor data indicative of the alarm event.

At the time of the alarm event, the user 105 may be streaming a movie from a content streaming source programming unit 152. Upon receipt of the message 158, the source programming interrupt unit may interrupt the streaming movie, and modify the movie so that image data such as a high-resolution video feed 156a of the alarm event is overlaid on top of the movie. The source programming interrupt unit 150 may select image data such as a high-resolution video feed 156a from multiple video feeds available from the connected-home monitoring system 100 based on the message 158. For example, the message 158 may identify a particular camera such as camera 130a that is capturing a video feed in the vicinity of the sensors 120b. A vicinity of the of the sensors 120b may include, for example, a distance from the sensor 120b that is predetermined, dynamically determined by the monitoring system control unit 110 (or monitoring application server 180), or the like. The source programming interrupt unit 150 may request a video feed from the camera 130a based on the message 158.

The high-resolution video feed 156a may be displayed via a dissolve-in effect, fly-in effect, or the like. A user may interact with the high-resolution video feed 156a. For example, the user 105 may move the high-resolution video feed 156a around the television 156 display using the user device 105a, voice commands, or the like. Alternatively, or in addition, the user 105 may resize the high-resolution video feed 156a. Alternatively, or in addition, the user may expand the high-resolution video feed 156a to occupy the entire display of the television. In some implementations, if the user 105 does not interact with the high-resolution video feed 156 within a predetermined amount of time, the source programming interrupt unit 150 may stop modifying the source programming, and remove the high-resolution video feed 156a from the display of the television 156.

The user may use the user device 105a to interact with one or more components of the connected-home monitoring system 100. For example, the user may use the user device 105a to deploy a drone 160 to confront the intruder 103, scan for a path to safety that is clear of the intruder, or the like. Alternatively, or in addition, the user 105 can use the user device 105a to lock one or more connected locks to the property. Alternatively, or in addition, the user 105 can use the user device 105a to contact law enforcement authorities. Alternatively, or in addition, the user 105 can use the user device 105a to disable the controlled-home monitoring system 100 in the event of a false alarm.

Figure 2:
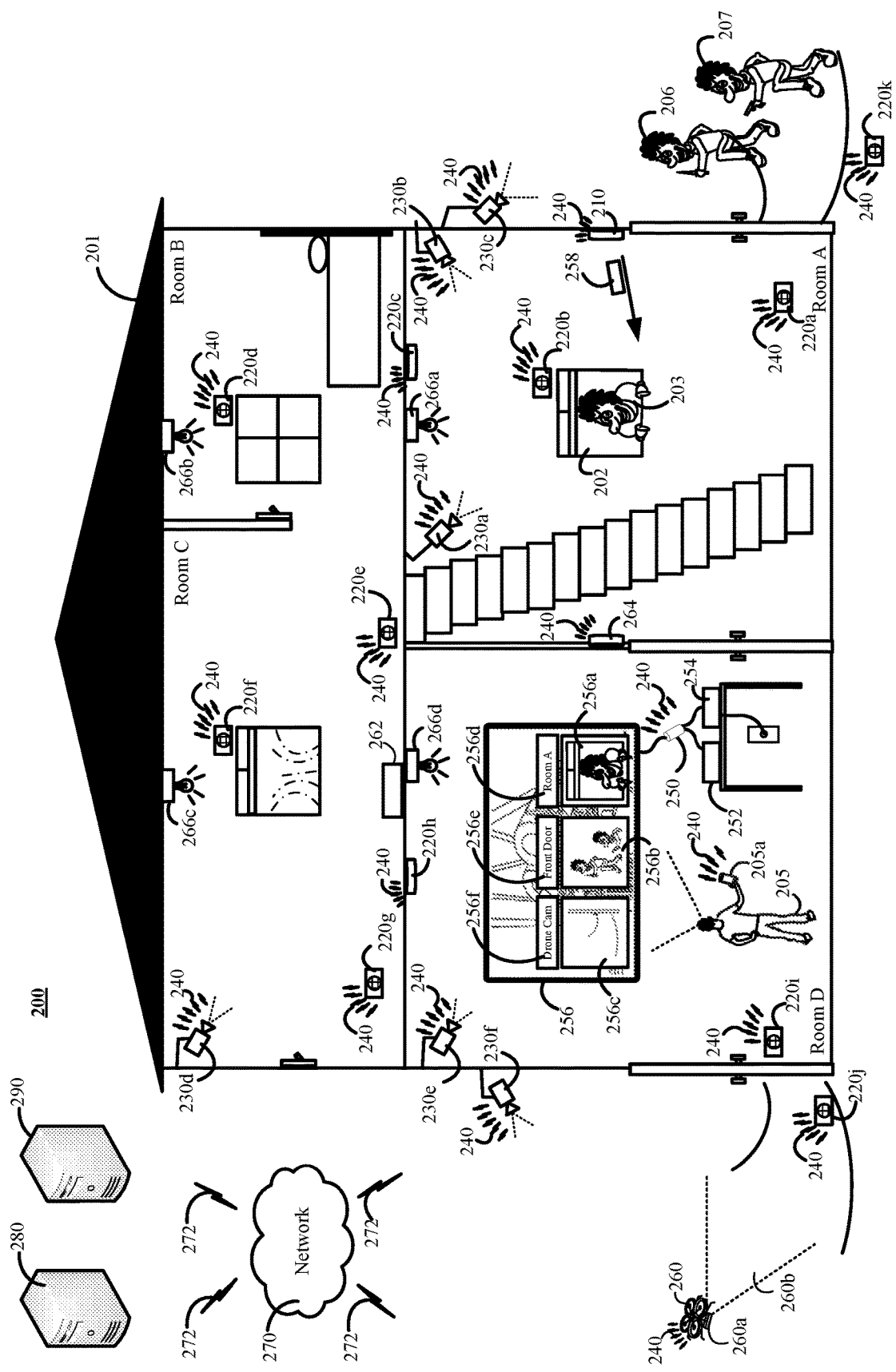
FIG. 2 is another contextual diagram of an example of a television that has been integrated into a connected-home monitoring system.

FIG. 2 is another contextual diagram of an example of a television 256 that has been integrated into a connected-home monitoring system 200.

The system 200 is substantially similar to the system 100 described above. However, the example of system 200 shows a source programming interrupt unit 250 that is outputting multiple high-resolution video feeds 256a, 256b, 256c on the display of television 256.

With reference to the example of system 200 of FIG. 2, a sensor 220b has detected movement, glass break, or the like that is indicative of an intruder 203 breaking into a window 202 in an attempt to gain entry to the property 201. In addition, the sensor 220k has detected that the intruders 206, 207 are near the front door of the property 201. The sensors 220b, 220k each generate sensor data that is detected by, for example, the monitoring system control unit 210. The monitoring system control unit 210 may analyze the detected sensor data and determine that an alarm event (e.g., a home invasion) is in progress in Room A and outside the front door. Alternatively, or in addition, the monitoring system control unit 210 (or other component of the connected-home monitoring system 200) can relay the received sensor data to the monitoring application server 280 via the networks 240 and 270. In such instances, the monitoring application server 280 can analyze the received sensor data and determine that an alarm event (e.g., a home invasion) is in progress in Room A and outside the front door. The monitoring application server 270 can transmit data to the monitoring system control unit 210 indicating the existence of the alarm event in Room A and outside the front door.

The monitoring system control unit 210 (or the monitoring application server 280) may generate and transmit a message 258 to the source programming interrupt unit 250 via the network 240 (or the networks 240, 270). The message 258 may include instructions that instruct the source programming interrupt unit 250 to interrupt and modify source programming provided by the one or more source programming units 252, 254. In some implementations, the message 258 may also include, for example, data identifying a camera that is capturing a video feed in the vicinity of each sensor such as sensors 220b, 220k that generated sensor data indicative of a respective alarm event.

At the time of the detected alarm events, the user 205 may be streaming a movie from a cable provider's on-demand service via a streaming source programming unit 254. Upon receipt of the message 258, the source programming interrupt unit 250 may interrupt the streaming movie, and modify the movie so that respective high-resolution video feeds 256a, 256b are overlaid on top of the movie. The source programming interrupt unit 250 may select a high-resolution video feed 256a, 256b from multiple video feeds available from the connected-home monitoring system 200 based on the message 258. For example, message 258 may identify one or more particular cameras such as cameras 230a and 230c that are capturing a video feed in the vicinity of the sensors 220b, 220k. The source programming interrupt unit 250 may transmit a request for a video feed from the cameras 230a, 230c based on the message 158. The request for a video feed may be transmitted directly to the cameras 230a, 230c, to the monitoring system control unit 220 which can forward the request to the respective cameras 230a, 230c, or to the monitoring application server 280 which can forward the request to the respective cameras 230a, 230c.

The high-resolution video feeds 256a, 256b may be displayed on the display of the television 256 and be interacted with in the same manner described with reference to the high-resolution video feed 156a from the example of FIG. 1. The source programming interrupt unit 250 may also output a label 256d, 256e for each respective high-resolution video feed 256a, 256b.

The user 205 may interact with the connected-home monitoring system 200 during the alarm event to find a route to safety. For example, upon review of the high-resolution video feeds 256a, 256b, the user 205 may instruct the connected-home monitoring system 200 to deploy a drone 260. The instruction may be a voice command detected by a microphone of the source programming interrupt unit 250, a microphone associated with the user device 205a, a microphone associated with another component of the connected-home monitoring system 200, or the like. Alternatively, the instruction may be input via a user device 205a such as a remote control, smartphone, or the like.

The user 205 may request that the drone 240 survey the property 201 capturing a video feed 260b using the drone's 240 camera 260a. The drone's video feed 260b may be viewed on the display of television 256 using the source programming interrupt unit 250. For example, a component of the connected-home system 200 (e.g., a microphone) may receive the user's request. In response to the request, the monitoring system control unit 210, monitoring application server 280, or the like may transmit a source programming interrupt message to the source programming interrupt unit 250 that identifies the drone's camera. The source programming interrupt unit 250 may obtain the drone's camera feed, interrupt the source programming, and modify the source programming provided by a source programming unit in order Alternatively, in response to the receipt of a user request for the drone's 260 camera feed 260b, the source programming interrupt unit 250 may request the drone's 260 video feed 260b, and then interrupt and further modify the movie the user is watching to display high-resolution video 256c from the drone's 260 camera 260a. The high-resolution video feed 256c may be labeled 256f as coming from the drone 260. In this manner, the user can view the drone's 260 video feed 260b using the television 256 to plan a route to safety during the alarm event detected by system 200.

The user 205 may be able to submit other instructions to the drone 260. For example, the user 205 may instruct the drone (alone or in addition to other drones that may belong to system 200) to engage the intruders 203, 206, 207. The drone 260 may navigate to the location of the intruders 203, 206, or 207, and engage the intruders 203, 206, 207. This may include, for example, performing facial recognition of the intruders 203, 206, 207, outputting loud sounds at the intruders 203, 206, 207, outputting bright lights at the intruders 203, 206, 207, swarming the intruders 203, 206, 207, electrically shocking the intruders 203, 206, 207, or the like. The user 205 may coordinate, or otherwise supervise, the drone 260 operations from Room D using the television to view the drone's 260 camera feed 260b during the drone's 260 engagement of the intruders 203, 207, 208.

Figure 3:
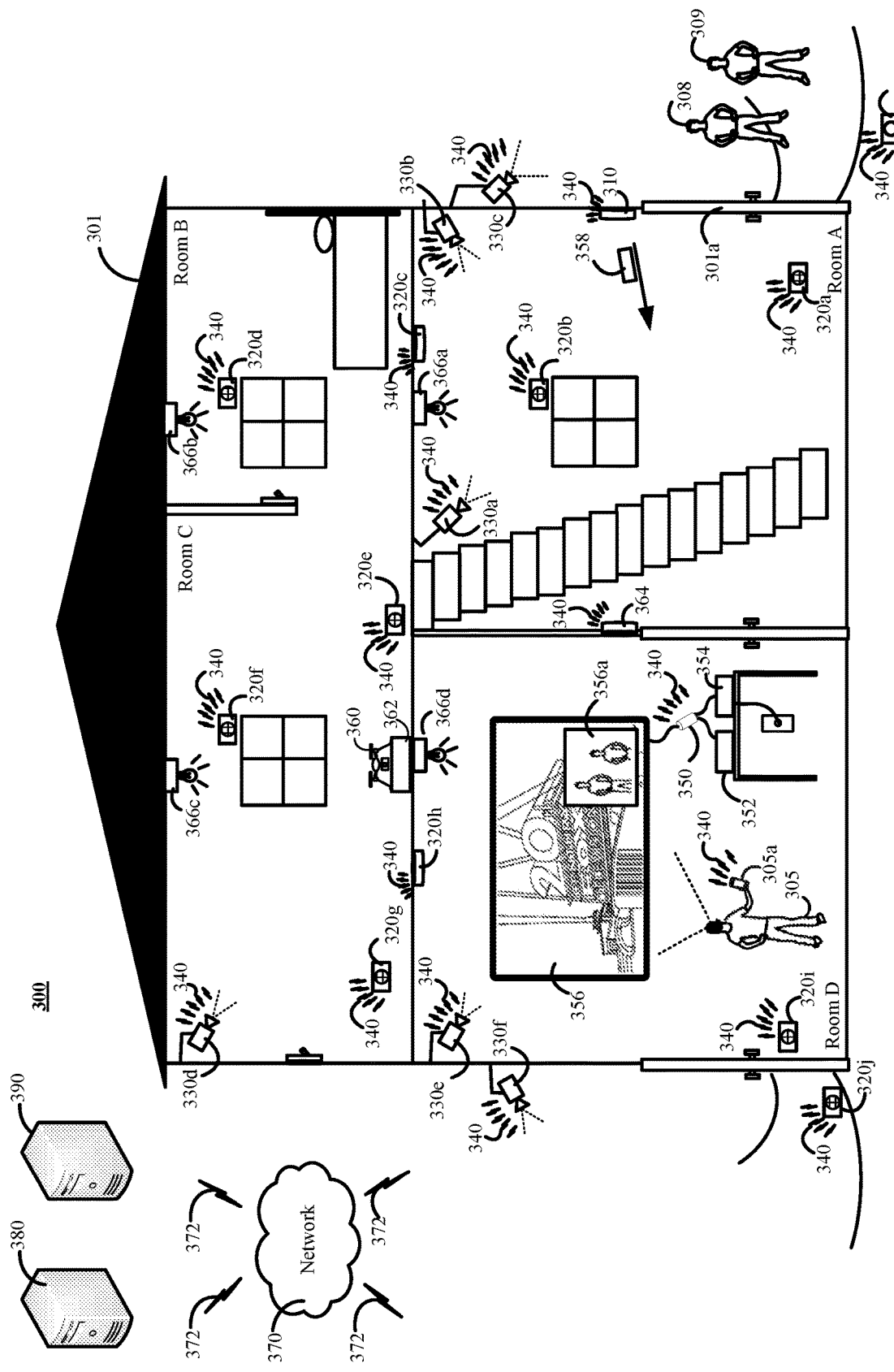
FIG. 3 is another contextual diagram of an example a television that has been integrated into a connected-home monitoring system.

FIG. 3 is another contextual diagram of an example a television 356 that has been integrated into a connected-home monitoring system 300.

The connected-home monitoring system 300 is substantially similar to the connected-home monitoring systems 100 and 200. However, the example of connected-home monitoring system 300 shows that a high-resolution video feed 356a can be provided in scenarios other than during a detected alarm event.

With reference to FIG. 3, for example, the user 305 is watching a cable TV broadcast on the television 356 that is being provided by a source programming unit 354 such as a cable box. While the user is watching the cable TV broadcast, two visitors 308, 309 arrive at the property 301 and ring a connected door bell (not depicted in FIG. 3). The monitoring system control unit 310 (or the monitoring application server 380) may detect that the door bell has been rung. For example, the doorbell may be a connected doorbell that includes a sensor that generates sensor data that can indicate whether a door bell has been rung. In response to the ringing of the connected door bell, the monitoring system control unit 310 (or the monitoring application server 380) may generate and transmit a message 358 to the source programming interrupt unit 350 via the network 340. The message 358 may include instructions that instruct the source programming interrupt unit 350 to interrupt and modify source programming provided by the source programming unit 354. In some implementations, the message 358 may also include, for example, data identifying a camera 330c that is associated with the connected door bell. A camera 330c may be associated with the connected doorbell if the camera provides a video feed of the one or more persons who rang the doorbell.

The source programming interrupt unit 350 may receive the message 358, and request a video feed from the camera 330c based on the received message 358. In the example of FIG. 3, the message 358 may identify the camera 330c because the monitoring system control unit 310 (or the monitoring application server 380) identified the camera 330c as being associated with the connected door bell. The source programming interrupt unit 350 may request a video feed from the camera 330c. The source programming interrupt unit may interrupt the cable TV broadcast, and modify the cable TV broadcast so that a high-resolution video feed 356a of the visitor(s) ringing the connected doorbell from camera 330c is overlaid on top of the cable TV broadcast.

The high-resolution video feed 356a may be displayed via a dissolve-in effect, fly-in effect, or the like. A user may interact with the high-resolution video feed 356a. For example, the user 305 may move the high-resolution video feed 356a around the television 356 display using the user device 305a, voice commands, or the like. Alternatively, or in addition, the user 305 may resize the high-resolution video feed 356a. Alternatively, or in addition, the user may expand the high-resolution video feed 356a to occupy the entire display of the television 356. In some implementations, if the user 305 does not interact with the high-resolution video feed 356 within a predetermined amount of time, the source programming interrupt unit 350 may stop modifying the source programming, and remove the high-resolution video feed 356a from the display of the television 356.

The user 305 may also input instructions using voice commands, user device 305a, or the like to one or more components of the connected-home monitoring system 300. For example, the user 305 may communicate with the visitors 308, 309 via a microphone that is associated with the user device 305c, a different microphone that is associated with the source programming interrupt unit 350, a different microphone that is associated with the connected-home monitoring system 300, or the like. The user 305 communication detected by one or more microphones may be output to the users 308, 309 using one or connected speakers, one or more connected displays, or the like. The user 305 can therefore communicate with the visitors 308, 309 using the camera 330c, one or more microphones, one or more speakers, and one or more output displays, the network 340, or a combination thereof. Alternatively, or in addition, after review of the high-resolution video feed 356a, the user 305 may utter a command (or input a command using the user device 305a) to unlock a connected lock of the door 301a so that the visitors 308, 309 can enter the property 301.

Figure 4:
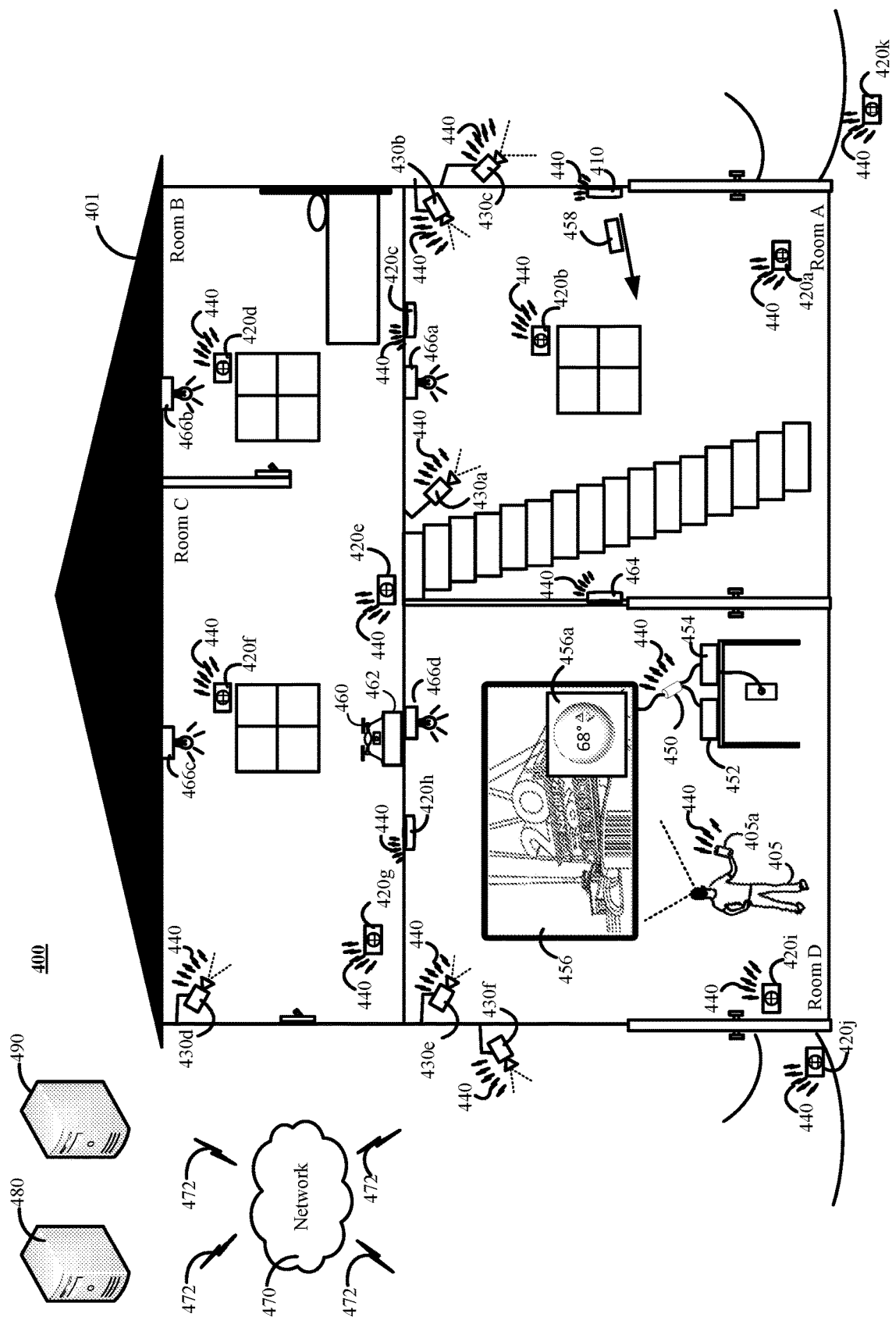
FIG. 4 is another contextual diagram of an example a television that has been integrated into a connected-home monitoring system.

FIG. 4 is another contextual diagram of an example a television 456 that has been integrated into a connected-home monitoring system 400.

The connected-home monitoring system 400 is substantially similar to the connected-home monitoring systems 100, 200, and 300. However, the example of connected-home monitoring system 400 shows that a high-resolution video feed 456a can be provided in order to adjust settings of one or more connected devices of the connected-home monitoring system 400.

With reference to FIG. 4, for example, the user 405 is watching a satellite TV broadcast on the television 456 that is being provided by a source programming unit 454 such as a satellite receiver. While the user is watching the satellite TV broadcast, the user 405 submits a request to access a connected-home device such as a thermostat 464. The request may include a voice command that is uttered by the user 405 and detected by a microphone on the source programming interrupt unit 450, a microphone on the user device 405a, a different microphone associated with the connected-home monitoring system 400, or the like. In response to the request, the monitoring system control unit 410 (or the monitoring application server 480) may generate and transmit a message 458 to the source programming interrupt unit 450 via the network 440. The message 458 may include instructions that instruct the source programming interrupt unit 450 to interrupt and modify source programming provided by the source programming unit 454. The message 458 may also include, for example, data identifying the connected device that the user 405 identified in the user's request.

The source programming interrupt unit 450 may receive the message 458, and request a high-resolution interface 456a that corresponds to the control interface of the connected device associated with the user's request. The source programming interrupt unit 450 may interrupt the satellite TV broadcast, and modify the satellite TV broadcast to output high-resolution interface 456a showing the control interface of the connected device. In the example of FIG. 4, the connected device is a connected thermostat 464. Though the connected thermostat is in Room A and the user 405 is in Room D behind closed doors, the user 405 can view the settings of the connected thermostat 464 remotely using the high-resolution interface 456a output by the source programming interrupt unit 450 via the display of the television 456.

The user 405 may submit commands to adjust the settings of a connected device. For example, the user can submit commands to raise the temperature settings, lower the temperature settings, program the temperature settings to change at a predetermined time, or the like. The user commands may be submitted via a voice command, using the user device 405a, or the like.

Though the example of FIG. 4 describes a user 405 viewing and adjusting settings of a connected thermostat, and remotely adjusting the settings of the adjust thermostat, the present disclosure need not be so limited. Instead, the user may request display, and modification of, settings for other connected devices throughout the property 401 such as connected lights, connected locks, connected blinds, connected windows, connected doors, and the like.

The examples of systems 100, 200, 300, and 400 described with respect to FIGS. 1-4 generally describe the present disclosure within the context of a television 156, 256, 356, 456 that is powered on at the time an interrupt message 158, 258, 358, 458 is transmitted to the source programming interrupt unit 150, 250, 350, 450. However, the present disclosure need not be so limited. For example, an interrupt message may be transmitted that includes a "power-on" instruction that instructs the television 156, 256, 356, 456 to be powered-on so that modified source programming can be displayed. Alternatively, the "power-on" message may be transmitted separately, and in-advance of, the interrupt message. In some implementations, the "power-on" instruction may be sent via HDCP. In such a manner, a connected-home monitoring system provider, central station operator, law enforcement officer, monitoring system control unit, monitoring application server, or remote user could transmit "power-on" instructions, alerts, or both to notify a person at a property 101, 201, 301, 401 of one or more potential events (e.g., alarm events, emergency events, family events, or the like).

With reference to FIGS. 1-4, examples of high-resolution graphics have included display of camera feeds in response to an alarm event, display of camera feeds in response to a connected doorbell being rung, display of a camera feed in response to a request for a camera feed from a connected video camera (e.g., a drone camera), or display of control interfaces for a connected-device. However, the present disclosure need not be so limited. For example, a user may synchronize one or more of the user's online accounts (e.g., a social media account, a cloud messaging account, cloud user profile, or the like) so that a provider associated with the online account can transmit interrupt messages to the source-programming interrupt unit to trigger display of notifications on top of source programming on a television 156, 256, 356, 456. The notifications may include, for example, social media postings, email notifications, email messages, text message notifications, text messages, weather alerts, severe weather alerts, weather information, and other types of content notifications from internet accessible sources, user cloud accounts, or the like. The source programming interrupt messages to initiate interrupt and display of one or more of the aforementioned notifications may be the same as the source interrupt messages described above but be generated by a different originating computer and include the display of different high-resolution graphics on top of the source programming.

Figure 5:
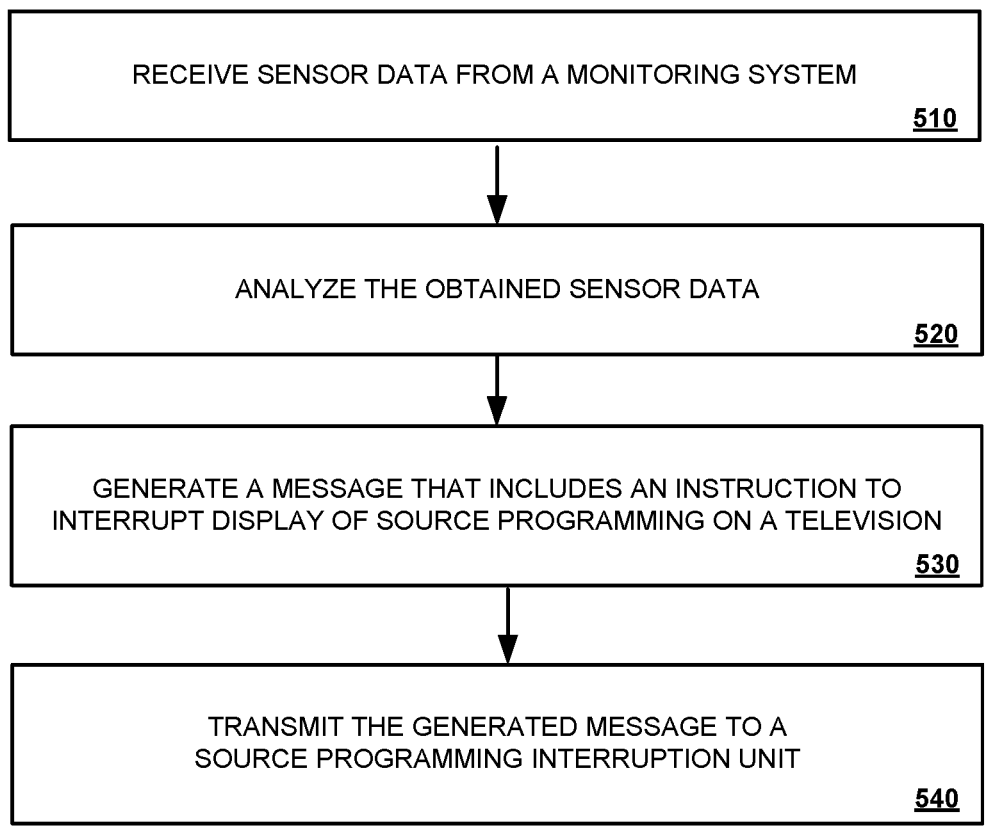
FIG. 5 is a flowchart of an example of a process for using a connected-home monitoring system to interrupt source programming provided to a television.

FIG. 5 is a flowchart of a process 500 for using a connected-home monitoring system to interrupt source programming provided to a television. Generally, the process 500 includes receiving sensor data from a monitoring system (510), analyzing the obtained sensor data (520), generating a message that includes an instruction to interrupt display of source programming on a television (530), and transmitting the generated message to a source programming interruption unit (540).

In more detail, connected-home monitoring system obtains 510 sensor data from one or more sensors. Obtaining sensor data from one or more sensors may include, for example, obtaining data generated by one or more motion sensors, one or more smoke sensors, one or more temperature sensors, one or more glass break sensors, one or more biometric sensors, a combination thereof, or the like. Alternatively, or in addition, obtaining data from one or more sensors may include obtaining an image, video, or both from one or more cameras.

The connected-home monitoring system analyzes 520 the sensor data obtained at stage 510 to determine whether a potential event is occurring at the property where the sensor data originated. For example, the connected-home monitoring system may determine, based on the obtained sensor data, that glass of a window was broken.

In response to a determination that a potential event exists at stage 520, the connected-home monitoring system generates 530 a message that includes an instruction to interrupt display of source programming on a television. The message may instruct a graphics processing unit of a source programming interrupt unit to switch from a source programming pass-through state to a source programming modification state.

In the source programming pass-through state, the source programming modification unit will receive source programming as an input, and then provide the same unaltered source programming as an output. In contrast, when in the source programming modification state, the source programming modification unit will use a graphics processing unit to modify source programming that is received as an input to the source programming modification unit to be overlaid with one or more high-resolution graphics associated with the connected-home monitoring system. High-resolution graphics associated with the connected-home monitoring system may include, for example, a video feed from a camera of the connected-home monitoring system, a camera feed from a drone-camera of the connected-home monitoring system, or the like. The generated message may include, for example, data that identifies a camera that is associated with the detected event. A camera is associated with a detected event if the camera provides a video feed showing a portion of a property where the potential event was detected. The connected-home monitoring system transmits 540 the generated message to a source programming interruption unit. The generated message may be transmitted using a network such as a WiFi network.

Figure 6:
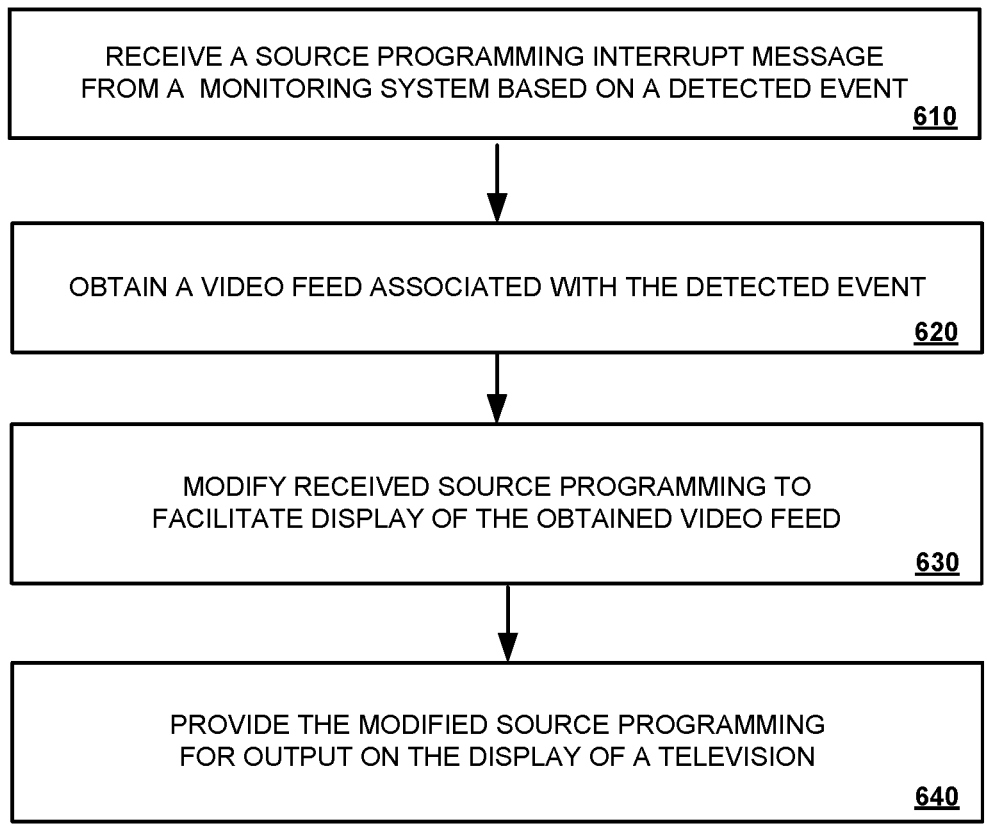
FIG. 6 is a flowchart of an example of a process for interrupting source programming provided to a television using a source programming interrupt unit.

FIG. 6 is a flowchart of a process 600 for interrupting source programming provided to a television using a source programming interrupt unit. Generally, the process 600 includes receiving a source programming interrupt message from a monitoring system based on a detected event (610), obtaining a video feed associated with the detected event (620), modifying received source programming to facilitate display of the obtained video feed (630), and providing the modified source programming for output on the display of a television (640).

In more detail, the source programming interrupt unit can receive 610 a source programming interrupt message from a component of the connected-home monitoring system. For example, the source programming interrupt unit may receive the source programming interrupt message from a monitoring system control unit, an application monitoring server, or the like. The source programming interrupt message may include (i) data identifying a camera that is associated with a detected event, and (ii) instructions that instruct a graphics processing unit of the source programming unit to switch from a source programming pass-through state to a source programming modification state.

The source programming interrupt unit can obtain 620 a video feed that is associated with the detected event. In some implementations, the source programming interrupt unit can obtain a video feed associated with a detected event based on information included in the source programming interrupt message. For example, the source programming interrupt message may include an identifier of a camera associated with an event. A camera may be associated with an event if the camera provides a video feed of a portion of a property associated with the event. The source programming interrupt unit can transmit a request via a network such as a WiFi network for a video feed to a particular camera of the controlled-home monitoring system that is identified in the source programming interrupt message. In response to the request for a video feed, the source programming interrupt unit can receive a video feed from the particular camera to which the request for a video feed was sent via a network such as a WiFi network.

The source programming interrupt unit can modify 630 source programming to facilitate display of the obtained video on a television display. For example, the source programming interrupt unit may interrupt a streaming movie, and modify the movie so that a high-resolution video feed from a camera in the vicinity of the alarm event is overlaid on top of at least a portion of the movie. The high-resolution video feed may be displayed via a dissolve-in effect, fly-in effect, or the like. The source programming interrupt unit can provide 640 the modified source programming for output on the display of a television.

Figure 7:
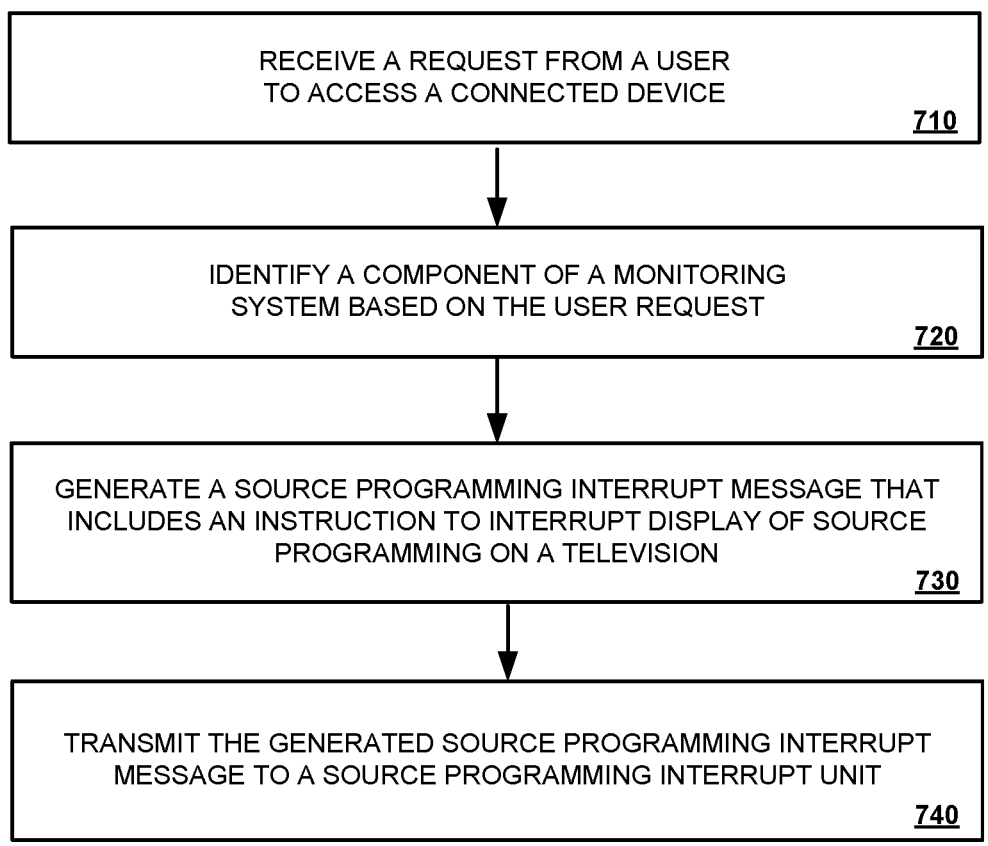
FIG. 7 is a flowchart of another example of a process for using a connected-home monitoring system to interrupt source programming provided to a television.

FIG. 7 is a flowchart of another example of a process 700 for using a connected-home monitoring system to interrupt source programming provided to a television. Generally, the process 700 includes receiving a request from a user to access a connected device (710), identifying a component of a monitoring system based on the request (720), generating a source programming interrupt message that includes an instruction to modify source programming based on the generated message (730), and transmitting the generated message to a source programming interrupt unit (740).

In more detail, the controlled-home monitoring system can receive 710 a request from a user to access a connected device. For example, a user can submit a request to access a control interface of a connected device such as a connected thermostat, a connected light, a connected lock, or the like. The request may include a voice command. Alternatively, the request may include input submitted using a remote control, a smartphone, a tablet, a smartwatch, or the like. The request may include, for example, the selection of a graphical icon on a menu that lists each respective connected device associated with a property.

The controlled-home monitoring system can identify 720 a component of the controlled-home monitoring system based on the user request. For example, the controlled-home monitoring system can transcribe a voice command uttered by a user, and obtain text from the transcription that identifies a connected device associated with the property. Alternatively, the controlled-home monitoring system may decode an input based on a selection of a button a remote control, a graphical icon displayed by a smartphone, or the like, and identify a connected device associated with the property based on the decoded input.

The controlled-home monitoring system can generate 730 a source programming interrupt message that includes an instruction to interrupt display of source programming on a television. The message may instruct a graphics processing unit of a source programming interrupt unit to switch from a source programming pass-through state to a source programming modification state.

In the source programming pass-through state, the source programming modification unit will receive source programming as an input, and then provide the same unaltered source programming as an output. In contrast, when in the source programming modification state, the source programming modification unit will use a graphics processing unit to modify source programming that is received as an input to the source programming modification unit to be overlaid with one or more high-resolution graphics associated with the connected-home monitoring system. The high-resolution graphics associated with the connected-home monitoring system may include, for example, a control interface of the connected device associated with the request received at stage 710 such as a connected thermostat, a connected light, a connected lock, or the like. A control interface may include, for example, an interface that provides data indicating current settings of the connected device, one or more controls for modifying the current settings of the connected device, or both. The generated message may include, for example, data that identifies the connected device associated with the request received at stage 710. The connected-home monitoring system transmits 740 the generated message to a source programming interruption unit. The generated message may be transmitted using a network such as a Wi-Fi network.

Figure 8:
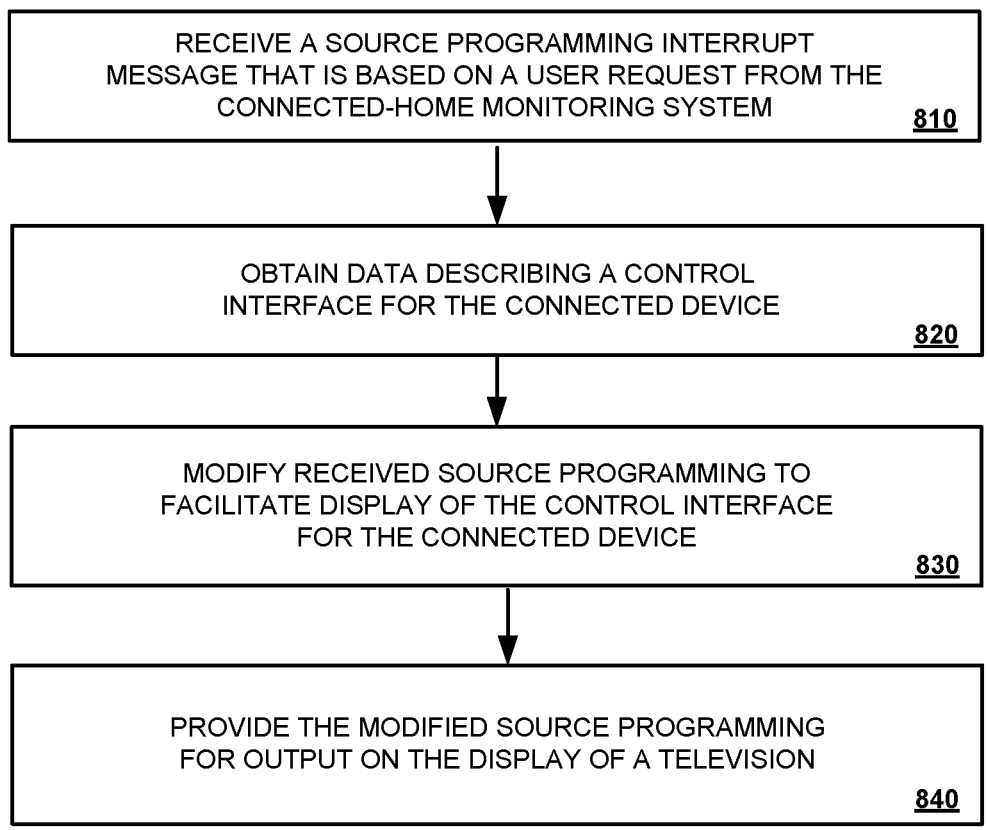
FIG. 8 is a flowchart of another example process for interrupting source programming provided to a television using a source programming interrupt unit.

FIG. 8 is a flowchart of another example process 800 for interrupting source programming provided to a television using a source programming interrupt unit. Generally, the process 800 includes receiving a source programming interrupt message from a monitoring system that was generated based on a user request (810), obtaining data describing a control interface of a connected device (820), modifying received source programming to facilitate display of the control interface for the connected device (830), and providing the modified source programming for output on the display of a television (840).

In more detail, the source programming interrupt unit can receive 810 a source programming interrupt message from a monitoring system that was generated based on a user request. For example, the source programming interrupt message received at stage 810 may be generated based on a user request for access to a control interface of a connected device such as a connected thermostat, a connected light, a connected lock, or the like. The received source programming interrupt message may include data identifying the connected device that was associated with the user's request.

The source programming interrupt unit can obtain 820 data describing the control interface of the connected device identified by the source programming interrupt message. For example, the source programming interrupt unit can request data corresponding to a control interface of a connected device from the connected device (or another component of the controlled-home monitoring system). Data corresponding to the control interface of the connected device may include the current settings of the connected device, one or more controls for adjusting the current settings, or both. In some implementations, data corresponding to the control interface of the connected device may be downloaded from a cloud server such as an application monitoring server.

The source programming interrupt unit can modify 830 source programming to facilitate display of the obtained video on a television display. For example, the source programming interrupt unit may interrupt a streaming cable TV show, and modify the cable TV show so that a high-resolution graphical control interface for a connected device associated with the user's request is overlaid on top of at least portion of the cable TV show. The high-resolution graphical control interface may be displayed via a dissolve-in effect, fly-in effect, or the like. The source programming interrupt unit can provide 840 the modified source programming for output on the display of a television.

Figure 9:
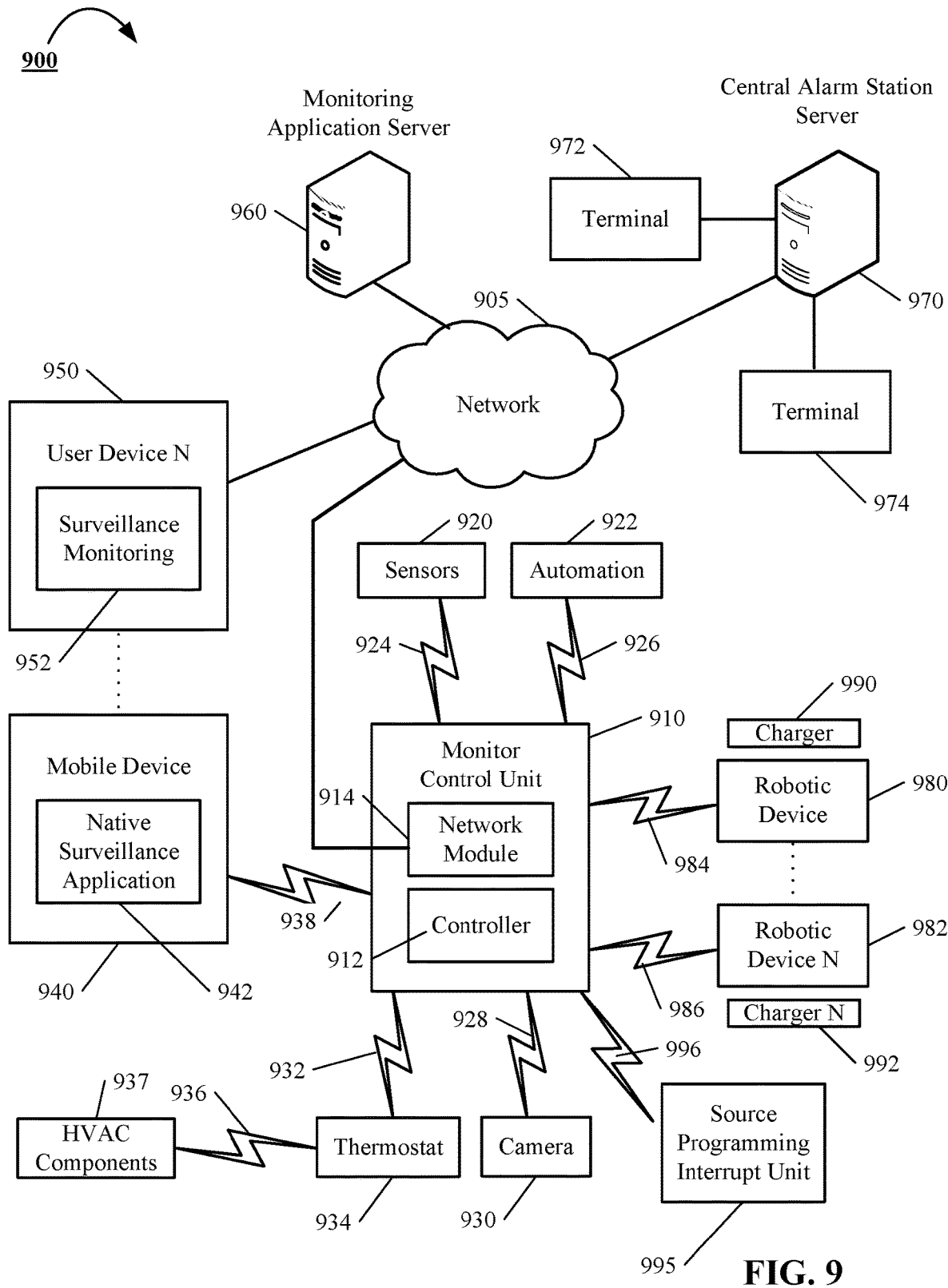
FIG. 9 is a block diagram of an example of a controlled-home security monitoring system.

FIG. 9 is a block diagram of an example of a controlled-home security monitoring system 900.

The electronic system 900 includes a network 905, a monitoring system control unit 910, one or more user devices 940, 950, a monitoring application server 960, and a central alarm station server 970. In some examples, the network 905 facilitates communications between the monitoring system control unit 910, the one or more user devices 940, 950, the monitoring application server 960, and the central alarm station server 970.

The network 905 is configured to enable exchange of electronic communications between devices connected to the network 905. For example, the network 905 may be configured to enable exchange of electronic communications between the monitoring system control unit 910, the one or more user devices 940, 950, the monitoring application server 960, and the central alarm station server 970. The network 905 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 905 may include multiple networks or subnetworks, each of which may include, for example, a wired or wireless data pathway. The network 905 may include a circuit-switched network, a packet-switched data network, or any other network able to carry electronic communications (e.g., data or voice communications). For example, the network 905 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 905 may include one or more networks that include wireless data channels and wireless voice channels. The network 905 may be a wireless network, a broadband network, or a combination of networks including a wireless network and a broadband network.

The monitoring system control unit 910 includes a controller 912 and a network module 914. The controller 912 is configured to control a monitoring system (e.g., a home alarm or security system) that includes the monitoring system control unit 910. In some examples, the controller 912 may include a processor or other control circuitry configured to execute instructions of a program that controls operation of an alarm system. In these examples, the controller 912 may be configured to receive input from sensors, detectors, or other devices included in the alarm system and control operations of devices included in the alarm system or other household devices (e.g., a thermostat, an appliance, lights, etc.). For example, the controller 912 may be configured to control operation of the network module 914 included in the monitoring system control unit 910.

The network module 914 is a communication device configured to exchange communications over the network 905. The network module 914 may be a wireless communication module configured to exchange wireless communications over the network 905. For example, the network module 914 may be a wireless communication device configured to exchange communications over a wireless data channel and a wireless voice channel. In this example, the network module 914 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 914 also may be a wired communication module configured to exchange communications over the network 905 using a wired connection. For instance, the network module 914 may be a modem, a network interface card, or another type of network interface device. The network module 914 may be an Ethernet network card configured to enable the monitoring system control unit 910 to communicate over a local area network and/or the Internet. The network module 914 also may be a voiceband modem configured to enable the alarm panel to communicate over the telephone lines of Plain Old Telephone Systems (POTS).

The monitoring system that includes the monitoring system control unit 910 includes one or more sensors or detectors. For example, the monitoring system may include multiple sensors 920. The sensors 920 may include a contact sensor, a motion sensor, a glass break sensor, or any other type of sensor included in an alarm system or security system. The sensors 920 also may include an environmental sensor, such as a temperature sensor, a water sensor, a rain sensor, a wind sensor, a light sensor, a smoke detector, a carbon monoxide detector, an air quality sensor, etc. The sensors 920 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors 920 may include a radio-frequency identification (RFID) sensor that identifies a particular article that includes a pre-assigned RFID tag.

The monitoring system control unit 910 communicates with the module 922 and the camera 930 to perform surveillance or monitoring. The module 922 is connected to one or more devices that enable home automation control. For instance, the module 922 may be connected to one or more lighting systems and may be configured to control operation of the one or more lighting systems. Also, the module 922 may be connected to one or more electronic locks at the property and may be configured to control operation of the one or more electronic locks (e.g., control Z-Wave locks using wireless communications in the Z-Wave protocol. Further, the module 922 may be connected to one or more appliances at the property and may be configured to control operation of the one or more appliances. The module 922 may include multiple modules that are each specific to the type of device being controlled in an automated manner. The module 922 may control the one or more devices based on commands received from the monitoring system control unit 910. For instance, the module 922 may cause a lighting system to illuminate an area to provide a better image of the area when captured by a camera 930.

The camera 930 may be a video/photographic camera or other type of optical sensing device configured to capture images. For instance, the camera 930 may be configured to capture images of an area within a building monitored by the monitoring system control unit 910. The camera 930 may be configured to capture single, static images of the area and also video images of the area in which multiple images of the area are captured at a relatively high frequency (e.g., thirty images per second). The camera 930 may be controlled based on commands received from the monitoring system control unit 910.

The camera 930 may be triggered by several different types of techniques. For instance, a Passive Infra Red (PIR) motion sensor may be built into the camera 930 and used to trigger the camera 930 to capture one or more images when motion is detected. The camera 930 also may include a microwave motion sensor built into the camera and used to trigger the camera 930 to capture one or more images when motion is detected. The camera 930 may have a "normally open" or "normally closed" digital input that can trigger capture of one or more images when external sensors (e.g., the sensors 920, PIR, door/window, etc.) detect motion or other events. In some implementations, the camera 930 receives a command to capture an image when external devices detect motion or another potential alarm event. The camera 930 may receive the command from the controller 912 or directly from one of the sensors 920.

In some examples, the camera 930 triggers integrated or external illuminators (e.g., Infra Red, Z-wave controlled "white" lights, lights controlled by the module 922, etc.) to improve image quality when the scene is dark. An integrated or separate light sensor may be used to determine if illumination is desired and may result in increased image quality.

The camera 930 may be programmed with any combination of time/day schedules, system "arming state", or other variables to determine whether images should be captured or not when triggers occur. The camera 930 may enter a low-power mode when not capturing images. In this case, the camera 930 may wake periodically to check for inbound messages from the controller 912. The camera 930 may be powered by internal, replaceable batteries if located remotely from the monitoring control unit 910. The camera 930 may employ a small solar cell to recharge the battery when light is available. Alternatively, the camera 930 may be powered by the controller's 912 power supply if the camera 930 is co-located with the controller 912.

In some implementations, the camera 930 communicates directly with the monitoring application server 960 over the Internet. In these implementations, image data captured by the camera 930 does not pass through the monitoring system control unit 910 and the camera 930 receives commands related to operation from the monitoring application server 960.

The system 900 also includes thermostat 934 to perform dynamic environmental control at the property. The thermostat 934 is configured to monitor temperature and/or energy consumption of an HVAC system associated with the thermostat 934, and is further configured to provide control of environmental (e.g., temperature) settings. In some implementations, the thermostat 934 can additionally or alternatively receive data relating to activity at a property and/or environmental data at a property, e.g., at various locations indoors and outdoors at the property. The thermostat 934 can directly measure energy consumption of the HVAC system associated with the thermostat, or can estimate energy consumption of the HVAC system associated with the thermostat 934, for example, based on detected usage of one or more components of the HVAC system associated with the thermostat 934. The thermostat 934 can communicate temperature and/or energy monitoring information to or from the monitoring system control unit 910 and can control the environmental (e.g., temperature) settings based on commands received from the monitoring system control unit 910.

In some implementations, the thermostat 934 is a dynamically programmable thermostat and can be integrated with the monitoring system control unit 910. For example, the dynamically programmable thermostat 934 can include the monitoring system control unit 910, e.g., as an internal component to the dynamically programmable thermostat 934. In addition, the monitoring system control unit 910 can be a gateway device that communicates with the dynamically programmable thermostat 934.

A module 937 is connected to one or more components of an HVAC system associated with a property, and is configured to control operation of the one or more components of the HVAC system. In some implementations, the module 937 is also configured to monitor energy consumption of the HVAC system components, for example, by directly measuring the energy consumption of the HVAC system components or by estimating the energy usage of the one or more HVAC system components based on detecting usage of components of the HVAC system. The module 937 can communicate energy monitoring information and the state of the HVAC system components to the thermostat 934 and can control the one or more components of the HVAC system based on commands received from the thermostat 934.

The system 900 further includes one or more robotic devices 980 and 982. The robotic devices 980 and 982 may be any type of robots that are capable of moving and taking actions that assist in security monitoring. For example, the robotic devices 980 and 982 may include drones that are capable of moving throughout a property based on automated control technology and/or user input control provided by a user. In this example, the drones may be able to fly, roll, walk, or otherwise move about the property. The drones may include helicopter type devices (e.g., quad copters), rolling helicopter type devices (e.g., roller copter devices that can fly and also roll along the ground, walls, or ceiling) and land vehicle type devices (e.g., automated cars that drive around a property). In some cases, the robotic devices 980 and 982 may be robotic devices that are intended for other purposes and merely associated with the monitoring system 900 for use in appropriate circumstances. For instance, a robotic vacuum cleaner device may be associated with the monitoring system 900 as one of the robotic devices 980 and 982 and may be controlled to take action responsive to monitoring system events.

In some examples, the robotic devices 980 and 982 automatically navigate within a property. In these examples, the robotic devices 980 and 982 include sensors and control processors that guide movement of the robotic devices 980 and 982 within the property. For instance, the robotic devices 980 and 982 may navigate within the property using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices 980 and 982 may include control processors that process output from the various sensors and control the robotic devices 980 and 982 to move along a path that reaches the desired destination and avoids obstacles. In this regard, the control processors detect walls or other obstacles in the property and guide movement of the robotic devices 980 and 982 in a manner that avoids the walls and other obstacles.

In addition, the robotic devices 980 and 982 may store data that describes attributes of the property. For instance, the robotic devices 980 and 982 may store a floorplan and/or a three-dimensional model of the property that enables the robotic devices 980 and 982 to navigate the property. During initial configuration, the robotic devices 980 and 982 may receive the data describing attributes of the property, determine a frame of reference to the data (e.g., a home or reference location in the property), and navigate the property based on the frame of reference and the data describing attributes of the property. Further, initial configuration of the robotic devices 980 and 982 also may include learning of one or more navigation patterns in which a user provides input to control the robotic devices 980 and 982 to perform a specific navigation action (e.g., fly to an upstairs bedroom and spin around while capturing video and then return to a home charging base). In this regard, the robotic devices 980 and 982 may learn and store the navigation patterns such that the robotic devices 980 and 982 may automatically repeat the specific navigation actions upon a later request.

In some examples, the robotic devices 980 and 982 may include data capture and recording devices. In these examples, the robotic devices 980 and 982 may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the property and users in the property. The one or more biometric data collection tools may be configured to collect biometric samples of a person in the home with or without contact of the person. For instance, the biometric data collection tools may include a fingerprint scanner, a hair sample collection tool, a skin cell collection tool, and/or any other tool that allows the robotic devices 980 and 982 to take and store a biometric sample that can be used to identify the person (e.g., a biometric sample with DNA that can be used for DNA testing).

In some implementations, the robotic devices 980 and 982 may include output devices. In these implementations, the robotic devices 980 and 982 may include one or more displays, one or more speakers, one or more projectors, and/or any type of output devices that allow the robotic devices 980 and 982 to communicate information to a nearby user. The one or more projectors may include projectors that project a two-dimensional image onto a surface (e.g., wall, floor, or ceiling) and/or holographic projectors that project three-dimensional holograms into a nearby space.

The robotic devices 980 and 982 also may include a communication module that enables the robotic devices 980 and 982 to communicate with the monitoring system control unit 910, each other, and/or other devices. The communication module may be a wireless communication module that allows the robotic devices 980 and 982 to communicate wirelessly. For instance, the communication module may be a Wi-Fi module that enables the robotic devices 980 and 982 to communicate over a local wireless network at the property. The communication module further may be a 900 MHz wireless communication module that enables the robotic devices 980 and 982 to communicate directly with the monitoring system control unit 910. Other types of short-range wireless communication protocols, such as Bluetooth, Bluetooth LE, Zwave, Zigbee, etc., may be used to allow the robotic devices 980 and 982 to communicate with other devices in the property.

The robotic devices 980 and 982 further may include processor and storage capabilities. The robotic devices 980 and 982 may include any suitable processing devices that enable the robotic devices 980 and 982 to operate applications and perform the actions described throughout this disclosure. In addition, the robotic devices 980 and 982 may include solid state electronic storage that enables the robotic devices 980 and 982 to store applications, configuration data, collected sensor data, and/or any other type of information available to the robotic devices 980 and 982.

The robotic devices 980 and 982 are associated with one or more charging stations 990 and 992. The charging stations 990 and 992 may be located at predefined home base or reference locations in the property. The robotic devices 980 and 982 may be configured to navigate to the charging stations 990 and 992 after completion of tasks needed to be performed for the monitoring system 900. For instance, after completion of a monitoring operation or upon instruction by the monitoring system control unit 910, the robotic devices 980 and 982 may be configured to automatically fly to and land on one of the charging stations 990 and 992. In this regard, the robotic devices 980 and 982 may automatically maintain a fully charged battery in a state in which the robotic devices 980 and 982 are ready for use by the monitoring system 900.

The charging stations 990 and 992 may be contact based charging stations and/or wireless charging stations. For contact based charging stations, the robotic devices 980 and 982 may have readily accessible points of contact that the robotic devices 980 and 982 are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the robotic devices 980 and 982 may charge through a wireless exchange of power. In these cases, the robotic devices 980 and 982 need only locate themselves closely enough to the wireless charging stations for the wireless exchange of power to occur. In this regard, the positioning needed to land at a predefined home base or reference location in the property may be less precise than with a contact based charging station. Based on the robotic devices 980 and 982 landing at a wireless charging station, the wireless charging station outputs a wireless signal that the robotic devices 980 and 982 receive and convert to a power signal that charges a battery maintained on the robotic devices 980 and 982.

In some implementations, each of the robotic devices 980 and 982 has a corresponding and assigned charging station 990 and 992 such that the number of robotic devices 980 and 982 equals the number of charging stations 990 and 992. In these implementations, the robotic devices 980 and 982 always navigate to the specific charging station assigned to that robotic device. For instance, the robotic device 980 may always use changing station 990 and the robotic device 982 may always use changing station 992.

In some examples, the robotic devices 980 and 982 may share charging stations. For instance, the robotic devices 980 and 982 may use one or more community charging stations that are capable of charging multiple robotic devices 980 and 982. The community charging station may be configured to charge multiple robotic devices 980 and 982 in parallel. The community charging station may be configured to charge multiple robotic devices 980 and 982 in serial such that the multiple robotic devices 980 and 982 take turns charging and, when fully charged, return to a predefined home base or reference location in the property that is not associated with a charger. The number of community charging stations may be less than the number of robotic devices 980 and 982.

Also, the charging stations 990 and 992 may not be assigned to specific robotic devices 980 and 982 and may be capable of charging any of the robotic devices 980 and 982. In this regard, the robotic devices 980 and 982 may use any suitable, unoccupied charging station when not in use. For instance, when one of the robotic devices 980 and 982 has completed an operation or is in need of battery charge, the monitoring system control unit 910 references a stored table of the occupancy status of each charging station and instructs the robotic device to navigate to the nearest charging station that is unoccupied.

The source programming interrupt unit 995 is a device that is configured to be installed between a television audio-visual input port and the output of a source programming unit. An audio-visual input port may include, for example, an HDMI input port, a USB-C input port, or the like. The output of the source programming unit may include, for example, an HDMI output port, a USB-C output port, or the like. The source programming interrupt unit 995 may include a graphical processing unit that is configured to modify source programming when in a source programming modification state. The graphically processing unit can, for example, overlay high resolution graphics on top of source programming provided by one or more source programming devices. The source programming interrupt unit 995 can output source programming, modified source programming, or both on the display of a television. The source programming interrupt unit 995 may also include network interface such as a WiFi interface, a Bluetooth interface, or the like. The source programming unit may be configured to communicate with the monitoring system control unit 910 using a communication link 996 and one or more networks 905.

The sensors 920, the module 922, the camera 930, the thermostat 934, and the robotic devices 980 and 982 communicate with the controller 912 over communication links 924, 926, 928, 932, 984, and 986. The communication links 924, 926, 928, 932, 984, and 986 may be a wired or wireless data pathway configured to transmit signals from the sensors 920, the module 922, the camera 930, the thermostat 934, and the robotic devices 980 and 982 to the controller 912. The sensors 920, the module 922, the camera 930, the thermostat 934, and the robotic devices 980 and 982 may continuously transmit sensed values to the controller 912, periodically transmit sensed values to the controller 912, or transmit sensed values to the controller 912 in response to a change in a sensed value.

The communication links 924, 926, 928, 932, 984, and 986 may include a local network. The sensors 920, the module 922, the camera 930, the thermostat 934, and the robotic devices 980 and 982 and the controller 912 may exchange data and commands over the local network. The local network may include 802.11 "WiFi" wireless Ethernet (e.g., using low-power WiFi chipsets), Z-Wave, Zigbee, Bluetooth, "Homeplug" or other "Powerline" networks that operate over AC wiring, and a Category 5 (CAT5) or Category 6 (CAT6) wired Ethernet network. The local network may be a mesh network constructed based on the devices connected to the mesh network.

The monitoring application server 960 is an electronic device configured to provide monitoring services by exchanging electronic communications with the monitoring system control unit 910, the one or more user devices 940, 950, and the central alarm station server 970 over the network 905. For example, the monitoring application server 960 may be configured to monitor events (e.g., alarm events) generated by the monitoring system control unit 910. In this example, the monitoring application server 960 may exchange electronic communications with the network module 914 included in the monitoring system control unit 910 to receive information regarding events (e.g., alarm events) detected by the monitoring system control unit 910. The monitoring application server 960 also may receive information regarding events (e.g., alarm events) from the one or more user devices 940, 950.

In some examples, the monitoring application server 960 may route alarm data received from the network module 914 or the one or more user devices 940, 950 to the central alarm station server 970. For example, the monitoring application server 960 may transmit the alarm data to the central alarm station server 970 over the network 905.

The monitoring application server 960 may store sensor and image data received from the monitoring system and perform analysis of sensor and image data received from the monitoring system. Based on the analysis, the monitoring application server 960 may communicate with and control aspects of the monitoring system control unit 910 or the one or more user devices 940, 950.

The monitoring system control unit 910, the monitoring application server 960, or both, may be configured to communicate with a source programming interrupt unit 995. For example, the monitoring system control unit 910 (or monitoring application server 960) may generate a source programming interrupt message that instructs the source programming interrupt unit 995 to change state from a source programming pass-through state to a source programming modification state. In the source programming pass-through state, the source programming interrupt unit 995 will allow source programming to pass from the input of the source programming interrupt unit 995 to the output of the source programming interface unit 995 without modification. In the source programming modification state, the source programming interrupt unit 995 may modify source programming to include one or more high-resolution graphics overlaid on top of the source programming being viewed on a television. The high-resolution graphics may include a video feed of a portion of a property associated with a detected event, a control interface of a connected device, or the like.

The central alarm station server 970 is an electronic device configured to provide alarm monitoring service by exchanging communications with the monitoring system control unit 910, the one or more mobile devices 940, 950, and the monitoring application server 960 over the network 905. For example, the central alarm station server 970 may be configured to monitor alarm events generated by the monitoring system control unit 910. In this example, the central alarm station server 970 may exchange communications with the network module 914 included in the monitoring system control unit 910 to receive information regarding alarm events detected by the monitoring system control unit 910. The central alarm station server 970 also may receive information regarding alarm events from the one or more mobile devices 940, 950 and/or the monitoring application server 960.

The central alarm station server 970 is connected to multiple terminals 972 and 974. The terminals 972 and 974 may be used by operators to process alarm events. For example, the central alarm station server 970 may route alarm data to the terminals 972 and 974 to enable an operator to process the alarm data. The terminals 972 and 974 may include general-purpose computers (e.g., desktop personal computers, workstations, or laptop computers) that are configured to receive alarm data from a server in the central alarm station server 970 and render a display of information based on the alarm data. For instance, the controller 912 may control the network module 914 to transmit, to the central alarm station server 970, alarm data indicating that a sensor 920 detected a door opening when the monitoring system was armed. The central alarm station server 970 may receive the alarm data and route the alarm data to the terminal 972 for processing by an operator associated with the terminal 972. The terminal 972 may render a display to the operator that includes information associated with the alarm event (e.g., the name of the user of the alarm system, the address of the building the alarm system is monitoring, the type of alarm event, etc.) and the operator may handle the alarm event based on the displayed information.

In some implementations, the terminals 972 and 974 may be mobile devices or devices designed for a specific function. Although FIG. 9 illustrates two terminals for brevity, actual implementations may include more (and, perhaps, many more) terminals.

The one or more user devices 940, 950 are devices that host and display user interfaces. For instance, the user device 940 is a mobile device that hosts one or more native applications (e.g., the native surveillance application 942). The user device 940 may be a cellular phone or a non-cellular locally networked device with a display. The user device 940 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 940 may perform functions unrelated to the monitoring system, such as placing personal telephone calls, playing music, playing video, displaying pictures, browsing the Internet, maintaining an electronic calendar, etc.

The user device 940 includes a native surveillance application 942. The native surveillance application 942 refers to a software/firmware program running on the corresponding mobile device that enables the user interface and features described throughout. The user device 940 may load or install the native surveillance application 942 based on data received over a network or data received from local media.

The native surveillance application 942 runs on mobile devices platforms, such as iPhone, iPod touch, Blackberry, Google Android, Windows Mobile, etc. The native surveillance application 942 enables the user device 940 to receive and process image and sensor data from the monitoring system.

The user device 950 may be a general-purpose computer (e.g., a desktop personal computer, a workstation, or a laptop computer) that is configured to communicate with the monitoring application server 960 and/or the monitoring system control unit 910 over the network 905. The user device 950 may be configured to display a surveillance monitoring user interface 952 that is generated by the user device 950 or generated by the monitoring application server 960. For example, the user device 950 may be configured to display a user interface (e.g., a web page) provided by the monitoring application server 960 that enables a user to perceive images captured by the camera 930 and/or reports related to the monitoring system. Although FIG. 9 illustrates two user devices for brevity, actual implementations may include more (and, perhaps, many more) or fewer user devices.

In some implementations, the one or more user devices 940, 950 communicate with and receive monitoring system data from the monitoring system control unit 910 using the communication link 938. For instance, the one or more user devices 940, 950 may communicate with the monitoring system control unit 910 using various local wireless protocols such as WiFi, Bluetooth, Z-Wave, ZigBee, HomePlug (Ethernet over powerline), or wired protocols such as Ethernet and USB, to connect the one or more user devices 940, 950 to local security and automation equipment. The one or more user devices 940, 950 may connect locally to the monitoring system and its sensors and other devices. The local connection may improve the speed of status and control communications because communicating through the network 905 with a remote server (e.g., the monitoring application server 960) may be significantly slower.

Although the one or more user devices 940, 950 are shown as communicating with the monitoring system control unit 910, the one or more user devices 940, 950 may communicate directly with the sensors and other devices controlled by the monitoring system control unit 910. In some implementations, the one or more user devices 940, 950 replace the monitoring system control unit 910 and perform the functions of the monitoring system control unit 910 for local monitoring and long range/offsite communication.

In other implementations, the one or more user devices 940, 950 receive monitoring system data captured by the monitoring system control unit 910 through the network 905. The one or more user devices 940, 950 may receive the data from the monitoring system control unit 910 through the network 905 or the monitoring application server 960 may relay data received from the monitoring system control unit 910 to the one or more user devices 940, 950 through the network 905. In this regard, the monitoring application server 960 may facilitate communication between the one or more user devices 940, 950 and the monitoring system.

In some implementations, the one or more user devices 940, 950 may be configured to switch whether the one or more user devices 940, 950 communicate with the monitoring system control unit 910 directly (e.g., through link 938) or through the monitoring application server 960 (e.g., through network 905) based on a location of the one or more user devices 940, 950. For instance, when the one or more user devices 940, 950 are located close to the monitoring system control unit 910 and in range to communicate directly with the monitoring system control unit 910, the one or more user devices 940, 950 use direct communication. When the one or more user devices 940, 950 are located far from the monitoring system control unit 910 and not in range to communicate directly with the monitoring system control unit 910, the one or more user devices 940, 950 use communication through the monitoring application server 960.

Although the one or more user devices 940, 950 are shown as being connected to the network 905, in some implementations, the one or more user devices 940, 950 are not connected to the network 905. In these implementations, the one or more user devices 940, 950 communicate directly with one or more of the monitoring system components and no network (e.g., Internet) connection or reliance on remote servers is needed.

In some implementations, the one or more user devices 940, 950 are used in conjunction with only local sensors and/or local devices in a house. In these implementations, the system 900 only includes the one or more user devices 940, 950, the sensors 920, the module 922, the camera 930, and the robotic devices 980 and 982. The one or more user devices 940, 950 receive data directly from the sensors 920, the module 922, the camera 930, and the robotic devices 980 and 982 and sends data directly to the sensors 920, the module 922, the camera 930, and the robotic devices 980 and 982. The one or more user devices 940, 950 provide the appropriate interfaces/processing to provide visual surveillance and reporting.

In other implementations, the system 900 further includes network 905 and the sensors 920, the module 922, the camera 930, the thermostat 934, and the robotic devices 980 and 982 are configured to communicate sensor and image data to the one or more user devices 940, 950 over network 905 (e.g., the Internet, cellular network, etc.). In yet another implementation, the sensors 920, the module 922, the camera 930, the thermostat 934, and the robotic devices 980 and 982 (or a component, such as a bridge/router) are intelligent enough to change the communication pathway from a direct local pathway when the one or more user devices 940, 950 are in close physical proximity to the sensors 920, the module 922, the camera 930, the thermostat 934, and the robotic devices 980 and 982 to a pathway over network 905 when the one or more user devices 940, 950 are farther from the sensors 920, the module 922, the camera 930, the thermostat 934, and the robotic devices 980 and 982. In some examples, the system leverages GPS information from the one or more user devices 940, 950 to determine whether the one or more user devices 940, 950 are close enough to the sensors 920, the module 922, the camera 930, the thermostat 934, and the robotic devices 980 and 982 to use the direct local pathway or whether the one or more user devices 940, 950 are far enough from the sensors 920, the module 922, the camera 930, the thermostat 934, and the robotic devices 980 and 982 that the pathway over network 905 is required. In other examples, the system leverages status communications (e.g., pinging) between the one or more user devices 940, 950 and the sensors 920, the module 922, the camera 930, the thermostat 934, and the robotic devices 980 and 982 to determine whether communication using the direct local pathway is possible. If communication using the direct local pathway is possible, the one or more user devices 940, 950 communicate with the sensors 920, the module 922, the camera 930, the thermostat 934, and the robotic devices 980 and 982 using the direct local pathway. If communication using the direct local pathway is not possible, the one or more user devices 940, 950 communicate with the sensors 920, the module 922, the camera 930, the thermostat 934, and the robotic devices 980 and 982 using the pathway over network 905.

In some implementations, the system 900 provides end users with access to images captured by the camera 930 to aid in decision making. The system 900 may transmit the images captured by the camera 930 over a wireless WAN network to the user devices 940, 950. Because transmission over a wireless WAN network may be relatively expensive, the system 900 uses several techniques to reduce costs while providing access to significant levels of useful visual information.

In some implementations, a state of the monitoring system and other events sensed by the monitoring system may be used to enable/disable video/image recording devices (e.g., the camera 930). In these implementations, the camera 930 may be set to capture images on a periodic basis when the alarm system is armed in an "Away" state, but set not to capture images when the alarm system is armed in a "Stay" state or disarmed. In addition, the camera 930 may be triggered to begin capturing images when the alarm system detects an event, such as an alarm event, a door opening event for a door that leads to an area within a field of view of the camera 930, or motion in the area within the field of view of the camera 930. In other implementations, the camera 930 may capture images continuously, but the captured images may be stored or transmitted over a network when needed.

Further, in some implementations, the system 900 intelligently leverages the robotic devices 980 and 982 to aid in security monitoring, property automation, and property management. For example, the robotic devices 980 and 982 may aid in investigating alarm events detected at the property by the monitoring system control unit 910. In this example, the monitoring system control unit 910 may detect an alarm event (e.g., a fire alarm, an entry into the property when the system is armed "Stay," etc.) and, based on the detected alarm event, control the robotic devices 980 and 982 to attempt to identify persons in the property at the time of the alarm event. Specifically, the monitoring system control unit 910 may send a control command to each of the robotic devices 980 and 982 that causes the robotic devices 980 and 982 to perform a coordinated and automated search for persons in the property. Based on the control command received, each of the robotic devices 980 and 982 begins navigating the property and captures images of the property while navigating. Each of the robotic devices 980 and 982 may execute a predefined navigation pattern within the property or the robotic devices 980 and 982 may execute a coordinated scan of the property in which the robotic devices 980 and 982 exchange location information and navigate to areas that have not been explored by one of the other devices.

In some examples, the robotic devices 980 and 982 may analyze the images captured during the scan of the property for the presence of persons in the captured images. For instance, the robotic devices 980 and 982 may use image processing techniques in an attempt to identify shapes in the captured images that resemble a human body. The robotic devices 980 and 982 also may analyze the images for moving objects (or use other techniques to identify moving objects) and target imaging on capture of moving objects.

Based on detection of a human or a moving object, the robotic devices 980 and 982 may lock onto the human or moving object and follow the human or moving object throughout the property. In this regard, the robotic devices 980 and 982 may follow the human or moving object throughout the property and capture images of the movement. In addition, once one of the robotic devices 980 and 982 locks onto a human or moving object, the robotic devices 980 and 982 coordinate to ensure that multiple of the robotic devices 980 and 982 do not lock onto the same human or moving object. The coordination may be direct amongst the robotic devices 980 and 982 and/or through the monitoring system control unit 910. The coordination may involve sharing the location of the human or moving object and/or attributes of the human or moving object being imaged. Based on the shared location and attributes, the robotic devices 980 and 982 may determine whether multiple robotic devices 980 and 982 have locked onto the same object and take action accordingly. If the robotic devices 980 and 982 determine that the robotic devices 980 and 982 have not locked onto the same object, the appropriate one of the robotic devices 980 and 982 continues to lock onto the object while the other robotic devices scan other areas of the property for other objects. If the robotic devices 980 and 982 determine that the robotic devices 980 and 982 have locked onto the same object, the robotic devices 980 and 982 negotiate to determine which of the robotic devices 980 and 982 will continue to lock onto the object while the other robotic devices stop locking onto the object and scan other areas of the property for other objects. The negotiation may select the robotic device that continues tracking the object based on one or more factors including the timing of when the devices locked onto the object (e.g., which device locked onto the object first), the positioning of the devices relative to the object (e.g., which is best positioned to image the object), the amount of battery power remaining (e.g., the device with the most battery power remaining), or any other factor that indicates the device most suited to track the object. To the extent the device tracking an object becomes less suitable for tracking the object (e.g., the battery power is running low), the robotic devices 980 and 982 may coordinate to hand off tracking of the object to another one of the robotic devices 980 and 982.

In some examples, the robotic devices 980 and 982 perform image recognition processing on the one or more images in an attempt to detect whether any identified humans are legitimate users of the property or intruders. In these examples, the robotic devices 980 and 982 may have access to images of legitimate users of the property and may compare images being captured to the accessed images of legitimate users. Based on the comparison, the robotic devices 980 and 982 use facial recognition techniques to determine whether the imaged user matches a legitimate user of the property or an intruder. The robotic devices 980 and 982 then use the determination of whether the imaged user matches a legitimate user of the property or an intruder to control further tracking operation.

For example, based on a determination that the imaged user is an intruder, the robotic devices 980 and 982 may continue tracking the intruder and ensure that images sufficient to identify the intruder have been captured. In this example, the robotic devices 980 and 982 may attempt to capture biometric data from the intruder, such as voiceprint data, fingerprint data, and/or biological samples with DNA of the intruder. In addition, the robotic devices 980 and 982 may take action to thwart the purpose of the intruder. For example, the robotic devices 980 and 982 may fly in random patterns around the intruder, may play loud sounds near the intruder, may shine lights near the intruder, may output identifying information collected about the intruder (e.g., male, around six feet tall and one hundred eighty pounds), may enable a central station operator or first responder to talk to the intruder through a two-way voice communication session established through the monitoring system control unit 910 and the robotic device, and may take other actions directed to disrupting the intruder.

Alternatively, based on a determination that the imaged user is a legitimate user, the robotic devices 980 and 982 may discontinue tracking the legitimate user and scan for intruders. The robotic devices 980 and 982 also may report the location of the legitimate user. The robotic devices 980 and 982 further may continue tracking the legitimate user and attempt to provide assistance to the user. For instance, if the alarm is a fire alarm event, the robotic devices 980 and 982 may stay near the legitimate user, continuously or periodically update the location of the legitimate user to assist another user or first responder in helping the legitimate user, provide audible reminders of what types of actions should be taken in a fire, enable a central station operator or first responder to talk to the legitimate user through a two-way voice communication session established through the monitoring system control unit 910 and the robotic device, and may take other actions directed to assisting the legitimate user.

In some examples, the robotic devices 980 and 982 may be assigned to different areas of the property where the robotic devices 980 and 982 can move in an unobstructed manner. In these examples, the robotic devices 980 and 982 may be assigned to different levels in a property (e.g., an upstairs robotic device and a downstairs robotic device) and even different rooms or sections that are potentially blocked by doors. The monitoring system control unit 910 coordinate tracking movement based on the assigned areas. For instance, the monitoring system control unit 910 determines areas in a property where an event has been detected (e.g., where motion is sensed, where a door or window is opened, etc.) and only controls the robotic devices assigned to the determined areas to operate. In this regard, the monitoring system control unit 910 may use location of users determined using sensors to control operation of the robotic devices 980 and 982.

In addition, the robotic devices 980 and 982 may be assigned as interior and exterior devices. The interior devices may navigate throughout an interior of the property. The exterior devices may navigate about an exterior periphery of the property. The exterior devices may be weather conditioned to remain outdoors (e.g., in an outdoor enclosure) at all times such that the exterior devices can explore an exterior of the property at any suitable time. In addition, the exterior devices may remain inside the property and the monitoring system control unit 910 may open a door to enable an exterior robotic device to leave and return to the property. For instance, an exterior device may have a base or reference location in a garage of the property and the monitoring system control unit 910 may automatically open a garage door to allow the exterior device to leave the garage and explore the exterior of the property.

In some implementations, the monitoring system control unit 910 may monitor operational status of the robotic devices 980 and 982 and coordinate further operation based on the operational status. In these implementations, the monitoring system control unit 910 may detect that a particular robotic device is no longer operational and control one or more other robotic devices to perform operations originally assigned to the non-operational robotic device. In addition, the monitoring system control unit 910 may determine that the non-operational robotic device was navigating close to an intruder and received an impact based on accelerometer data prior to becoming non-operational. In this case, the monitoring system control unit 910 may infer that the robotic device was smashed by the intruder and control other robotic devices based on the inference. For instance, after inferring a smash event, the monitoring system control unit 910 may control operation of other robotic devices to maintain distance from the intruder by only flying high overhead.

In some implementations, the monitoring system control unit 910 may determine battery power available for each of the robotic devices 980 and 982 and coordinate operation of the robotic devices 980 and 982 based on available battery power. In these implementations, the robotic devices 980 and 982 may report battery power remaining to the monitoring system control unit 910 and the monitoring system control unit 910 may determine a subset of the robotic devices 980 and 982 to deploy based on the battery power information. For instance, the monitoring system control unit 910 may select to initially deploy the robotic device with the most available battery power to allow the other robotic devices to charge while the selected device assists with monitoring. Once the battery power for the selected device falls below a threshold, the monitoring system control unit 910 may return the selected device to a charging station and select the robotic device with the presently highest available battery power to resume the monitoring options being performed. The monitoring system control unit 910 may cycle through all of the robotic devices 980 and 982 in an intelligent manner that best leverages the battery power available. If the battery power of a device becomes too low to effectively operate as a navigating device, the monitoring system control unit 910 may control the robotic device to remain stationary and act as a stationary camera or other sensor to still assist with monitoring, although the added benefit of navigation no longer exists.

In addition to battery, the monitoring system control unit 910 may select the robotic device to deploy and what action to take based on the sensor that triggered the event, a time of day, and a state of the system. For instance, if the monitoring system control unit 910 detects an unusual motion sensor event, the monitoring system control unit 910 may select the nearest robotic device to navigate to an area of the property where motion was detected and investigate. Alternatively, if the monitoring system control unit 910 detects a critical alarm event (e.g., a security breach of a system armed stay, a fire alarm, a carbon monoxide alarm, etc.), the monitoring system control unit 910 may deploy all robotic devices 980 and 982 at any time of the day. If the monitoring system control unit 910 detects an intrusion breach, the monitoring system control unit 910 may assign some devices to "attack" the intruder by disrupting the purpose of the intruder and collecting identifying information for the intruder and assign some devices to search for other users in the property. The selected devices and actions taken may vary based on sensor data, time of day, and the state of the monitoring system.

In some implementations, the system 900 allows central station operators, first responders, and/or users of the property to interact with and control the robotic devices 980 and 982. In these implementations, a central station operator, first responder, or user of the property may provide input to control the robotic devices 980 and 982 in a manner that best assists with monitoring and investigation of detected events. For instance, the central station operator, first responder, or user of the property may remotely control navigation of the robotic devices 980 and 982. The central station operator, first responder, or user of the property also may provide general commands related to actions the robotic devices 980 and 982 are designed to take. In response to these general commands, the robotic devices 980 and 982 may automatically perform the desired actions, such as following an instruction to explore the property or following an instruction to navigate to an upstairs bedroom.

In some examples, the robotic devices 980 and 982 may periodically perform test sequences to ensure the robotic devices 980 and 982 will operate correctly if needed. In these examples, the robotic devices 980 and 982 may periodically navigate predefined navigation patterns used to investigate the property and/or may navigate around the property in a scanning sequence. The robotic devices 980 and 982 may determine whether the test sequences perform correctly or whether an error occurs that prevents full investigation of the property. To the extent an error occurs, the robotic devices 980 and 982 report the error and enable a user of the property or a technician to correct the error prior to a time when the robotic devices 980 and 982 would be needed for safety monitoring.

The monitoring system control unit 910 also may arrange the test sequences to occur during periods of time that are convenient for users of the property. For example, the monitoring system control unit 910 may assess sensor data at the property and determine a time period in which the property is unoccupied and unlikely to be occupied until the test sequences complete. In this example, the monitoring system control unit 910 waits until the preferred time period to initiate test sequences for one or more of the robotic devices 980 and 982.

In some examples, the robotic devices 980 and 982 may be used to provide a critical alert to a user in the property or attempt to wake a sleeping person as appropriate. In these examples, none of the users may be responding to a critical alert and, in response, the monitoring system control unit 910 may control the robotic devices 980 and 982 to search for a person in the property and provide the critical alert very close to an identified person in a manner that is highly likely to gain the person's attention to the critical alert. In the event that the person appears to be sleeping in the property, the robotic devices 980 and 982 may attempt to wake the person by providing loud input very near the person and/or by making contact with the person. In this regard, the robotic devices 980 and 982 may be useful in waking a sleeping person when a fire or carbon monoxide alarm has been detected and the person needs to leave the property. The robotic devices 980 and 982 also may determine when a person is nonresponsive (e.g., unconscious) and may be need of immediate assistance. Also, the robotic devices 980 and 982 may serve as an alarm clock for critical meetings based on a person having trouble waking up using traditional alarm clocks.

In some implementations, the robotic devices 980 and 982 may operate as mobile sensors that move throughout the property. In these implementations, the robotic devices 980 and 982 may have temperature sensors that can be used as inputs to a thermostat at the property. In this regard, the robotic devices 980 and 982 may navigate throughout the property and take temperature measurements at various locations in the property. With the temperatures at various locations, the system 900 may identify hot and/or cold spots in the property and adjust thermostat operation accordingly. For instance, the robotic devices 980 and 982 may be deployed to take temperature measurements in areas of the property where people are located and the thermostat may be adjusted to improve the temperature in the location where people are actually located in the property.

In some examples, the robotic devices 980 and 982 may have humidity and air flow sensors in addition to temperature sensors. In these examples, the robotic devices 980 and 982 may periodically navigate throughout the property and take temperature, humidity, and air flow measurements at various locations throughout the property. The system 900 may use the temperature, humidity, and air flow measurements to detect inefficient areas of the property. The inefficiencies may be used to detect areas where insulation in the property in deficient (e.g., new siding, windows, and/or doors may be useful in certain areas) and/or where leaks exist in the property. The property efficiency information may be provided to a user of the property to enable the user to improve efficiency in the property.

The invention claimed is:

1. A controlled-home security system comprising:
a display device;
a source programming unit;
a plurality of cameras installed at a property, each of the plurality of cameras generating a video feed;
a source programming interrupt unit, wherein the source programming interrupt unit is a device that is located between the display device and the source programming unit, with content provided to the display device and from the source programming unit being transmitted to the display device and from the source programming unit through the source programming interrupt unit; and
a monitoring unit comprising:
one or more processors; and
one or more storage devices storing instructions that, when executed by the one or more processors, cause the monitoring unit to perform operations, the operations including:
determining, based on analyzing sensor data generated by one or more sensors installed at the property that includes at least one of a microphone, a glass break sensor, or a biometric sensor, (i) that a break-in event is occurring at the property and (ii) a portion of the property where the break-in event is occurring;
determining, based on said determining that the break-in event is occurring, an alarm condition occurring at the portion of the property;
determining, based on the alarm condition, to interrupt the content from the source programming unit provided to the display device and a particular camera that is located within a vicinity of the one or more sensors and capturing a video feed in the vicinity of the one or more sensors associated with the detected break-in event occurring at the portion of the property; and
providing, to the source programming interrupt unit, a source programming interrupt message that (i) includes an identifier of the particular camera associated with the break-in event; and (ii) includes instructions for the source programming interrupt unit to modify the content received from the source programming unit that is coupled to the display device via the source programming interrupt unit,
wherein the source programming interrupt unit, in response to receiving the source programming interrupt message, transmits a request to the monitoring unit or directly to the particular camera to receive the video feed from the particular camera;
wherein said modifying the content comprises changing the content from the source programming unit that, when output on the display device, does not include the video feed into a modified source programming that, when output on the display device, includes (i) the video feed in place of at least a portion of the content from the source programming unit, and (ii) a displayed label indicating a location of the video feed, and wherein the source programming interruption unit further displays a notification on top of the content from the source programming unit on the display device indicating at least one of social media postings, email notifications, email messages, text message notifications, text messages, weather alerts, severe weather alerts, and weather information.

2. The system of claim 1, wherein said modifying the content further comprises when the modified source programming is output on the display device, the video feed from the particular camera and the displayed label indicating the location of the video feed are overlaid on top of at least a portion of the content from the source programming unit.

3. The system of claim 1, wherein the source programming unit is only coupled to the display device through the source programming interrupt unit.

4. The system of claim 1, the operations further including sending a power-on instruction from the monitoring unit to the source programming interrupt unit via HDCP to instruct the display device to be powered on to display the modified source programming on the display device.

5. The system of claim 4, wherein the power-on instruction is sent in advance of the source programming interrupt message.

6. The system of claim 1, wherein the display device includes a television.

7. The system of claim 1, wherein the source programming interrupt unit is a device that is external to a housing of the display device and external to a housing of the source programming unit.

8. The system of claim 1, wherein the source programming interrupt unit is coupled to an HDMI port of the display device using a first HDMI connector and the source programming interrupt unit is coupled to an HDMI port of the source programming unit using a second HDMI connector.

9. The system of claim 1, wherein the source programming interrupt unit is coupled to a USB-C port of the display device using a first USB-C connector and the source programming interrupt unit is coupled to a USB-C port of the source programming unit using a second USB-C connector.

10. The system of claim 1, wherein the one or more sensors further include at least one of a temperature sensor, a smoke sensor, a gas detector, a fire sensor, a humidity sensor, or an air flow sensor.

11. The system of claim 10, the operations further including:
  detecting, based on sensor data generated by the one or more sensors that includes at least one of the smoke sensor, the temperature sensor, the fire sensor, or the gas detector, an occurrence of an emergency event at the property;
  determining, based on said detecting the occurrence of the emergency event, an alarm condition occurring at a portion of the property;
  determining, based on the alarm condition, to interrupt a source programming provided to the display device and a particular camera that is located within a vicinity of the one or more sensors detecting the occurrence of the emergency event and capturing a video feed in the vicinity of the one or more sensors associated with the occurrence of the emergency event occurring at the portion of the property; and providing, to the source programming interrupt unit, a source programming interrupt message that (i) includes an identifier of the particular camera associated with the occurrence of the emergency event; and (ii) includes instructions for the source programming interrupt unit to modify the source programming received by the source programming unit that is coupled to the display device via the source programming interrupt unit.

12. A method performed by a monitoring unit of a controlled home security system comprising:
  determining, by the monitoring unit and based on analyzing sensor data generated by one or more sensors installed at a property that includes at least one of a microphone, a glass break sensor, or a biometric sensor, (i) that a break-in event is occurring at the property and (ii) a portion of the property where the break-in event is occurring;
  determining, by the motioning unit based on said determining that the break-in event is occurring, an alarm condition occurring at the portion of the property;
  determining, by the motioning unit based on the alarm condition, to interrupt a content from a source programming unit provided to a display device and a particular camera, among a plurality of cameras installed at the property, that is located within a vicinity of the one or more sensors and capturing a video feed in the vicinity of the one or more sensors associated with the detected break-in event occurring at the portion of the property; and
  providing, by the monitoring unit, to a source programming interrupt unit, a source programming interrupt message that (i) includes an identifier of the particular camera associated with the break-in event; and
  (ii) includes instructions for the source programming interrupt unit to modify the content received by the source programming unit that is coupled to the display device via the source programming interrupt unit,
  wherein the source programming interrupt unit, in response to receiving the source programming interrupt message, transmits a request to the monitoring unit or directly to the particular camera to receive the video feed from the particular camera;
  wherein said modifying the the content comprises changing the content from the source programming unit that, when output on the display device, does not include the video feed into a modified source programming that, when output on the display device, includes (i) the video feed in place of at least a portion of the content from the source programming unit, and (ii) a displayed label indicating a location of the video feed, and
  wherein the source programming interruption unit further displays a notification on top of the content from the initial source programming on the display device indicating at least one of social media postings, email notifications, email messages, text message notifications, text messages, weather alerts, severe weather alerts, and weather information.

13. The method of claim 12, wherein said modifying the content further comprises when the modified source programming is output on the display device, the video feed from the particular camera and the displayed label indicating the location of the video feed are overlaid on top of at least a portion of the content from the source programming unit.

14. The method of claim 12, wherein the source programming unit is only coupled to the display device through the source programming interrupt unit.

15. A non-transitory computer-readable medium storing software comprising instructions executable by one or more computers which, upon such execution, cause the one or more computers of a monitoring unit of a controlled-home security system to perform operations comprising:
- determining, by the monitoring unit and based on analyzing sensor data generated by one or more sensors installed at the property that includes at least one of a microphone, a glass break sensor, or a biometric sensor, (i) that a break-in event is occurring at the property and (ii) a portion of the property where the break-in event is occurring;
- determining, by the motioning unit based on said determining that the break-in event is occurring, an alarm condition occurring at the portion of the property;
- determining, by the motioning unit based on the alarm condition, to interrupt a content from a source programming unit provided to a display device and a particular camera, among a plurality of cameras installed at the property, that is located within a vicinity of the one or more sensors and capturing a video feed in the vicinity of the one or more sensors associated with the detected break-in event occurring at the portion of the property; and
- providing, by the monitoring unit, to a source programming interrupt unit, a source programming interrupt message that (i) includes an identifier of the particular camera associated with the break-in event; and (ii) includes instructions for the source programming interrupt unit to modify the content received by the source programming unit that is coupled to the display device via the source programming interrupt unit, wherein the source programming interrupt unit, in response to receiving the source programming interrupt message, transmits a request to the monitoring unit or directly to the particular camera to receive the video feed from the particular camera;

wherein said modifying the content comprises changing the content from the source programming unit that, when output on the display device, does not include the video feed into a modified source programming that, when output on the display device, includes (i) the video feed in place of at least a portion of the content from the source programming unit, and (ii) a displayed label indicating a location of the video feed, and wherein the source programming interruption unit further displays a notification on top of the content from the initial source programming on the display device indicating at least one of social media postings, email notifications, email messages, text message notifications, text messages, weather alerts, severe weather alerts, and weather information.

* * * * *